(12) United States Patent
Suhami

(10) Patent No.: US 7,863,579 B2
(45) Date of Patent: Jan. 4, 2011

(54) DIRECTIONAL NEUTRON DETECTOR

(76) Inventor: Avraham Suhami, 465 Willow Glen Way, apt. 325, San Jose, CA (US) 95125

( * ) Notice: Subject to any disclaimer, the term of this patent is extended or adjusted under 35 U.S.C. 154(b) by 73 days.

(21) Appl. No.: 12/116,774

(22) Filed: May 7, 2008

(65) Prior Publication Data
US 2009/0014662 A1    Jan. 15, 2009

Related U.S. Application Data

(60) Provisional application No. 60/928,272, filed on May 9, 2007, provisional application No. 61/065,623, filed on Feb. 14, 2008.

(51) Int. Cl.
*G01T 3/06* (2006.01)
(52) U.S. Cl. .................................. 250/390.11
(58) Field of Classification Search ............. 250/390.11
See application file for complete search history.

(56) References Cited

U.S. PATENT DOCUMENTS

| | | | |
|---|---|---|---|
| 3,794,843 A * | 2/1974 | Chen ................... | 250/359.1 |
| 5,155,366 A * | 10/1992 | Miller .................. | 250/368 |
| 5,266,808 A * | 11/1993 | Siegmund et al. ......... | 250/368 |
| 5,308,986 A * | 5/1994 | Walker .................. | 250/370.11 |
| 5,395,805 A * | 3/1995 | Droege et al. ............ | 501/12 |
| 5,410,156 A * | 4/1995 | Miller .................. | 250/390.04 |
| 5,569,907 A * | 10/1996 | Meunier ................ | 250/208.1 |
| 5,591,967 A * | 1/1997 | Moake .................. | 250/252.1 |
| 6,472,665 B1 * | 10/2002 | Ishisaka et al. ........... | 250/368 |
| 2006/0194453 A1 * | 8/2006 | Murakami et al. ......... | 438/787 |
| 2008/0093557 A1 * | 4/2008 | Cooke et al. ............. | 250/361 R |

OTHER PUBLICATIONS

Rossi et al. Refractive and diffractive properties of planar micro-optical elements, Applied Optics, vol. 34, No. 26 (Sep. 1995), pp. 5996-6007.*
Ryan et al. A prototype for SONTRAC, a scintillating plastic fiber detector for solar neutron spectroscopy, SPIE vol. 3114 (Oct. 1997), pp. 514-525.*
Izumi et al. Development of a gated scintillation fiber neutron detector for areal density measurements of inertial confinement fusion capsules, Review of Scientific Instruments vol. 74, No. 3 (Mar. 2003), pp. 1722-1725.*

* cited by examiner

*Primary Examiner*—David P Porta
*Assistant Examiner*—Shun Lee

(57) ABSTRACT

A directional neutron detector consisting of very thin plastic scintillation fibers and optically coupled to a photo-sensor array, where the directionality of Neutrons is estimated from the sequence of fibers traversed by the scattered protons and energy deposited in each one of them. Several fabrication methods of the large thin fiber arrays are described.

12 Claims, 17 Drawing Sheets

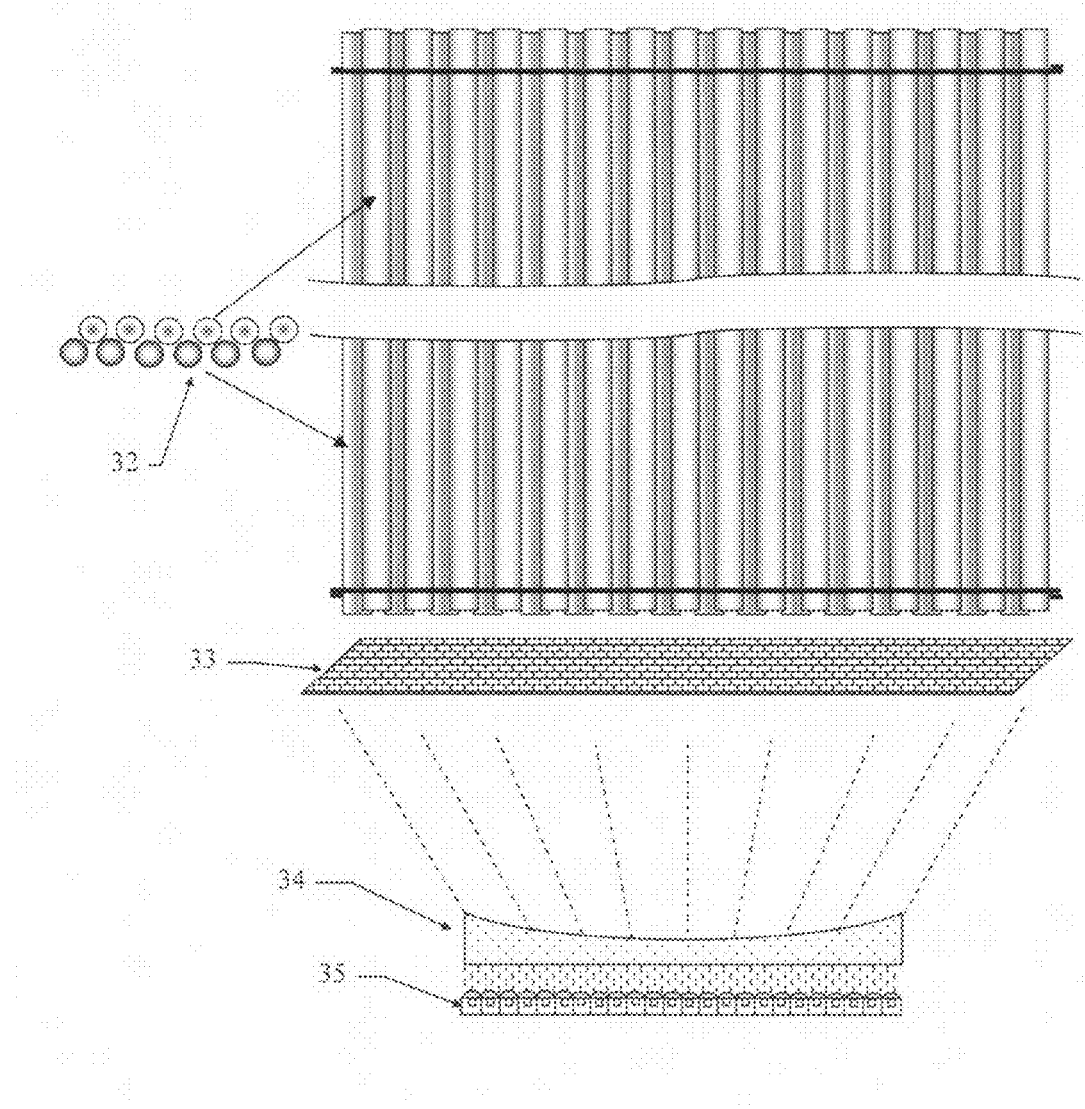

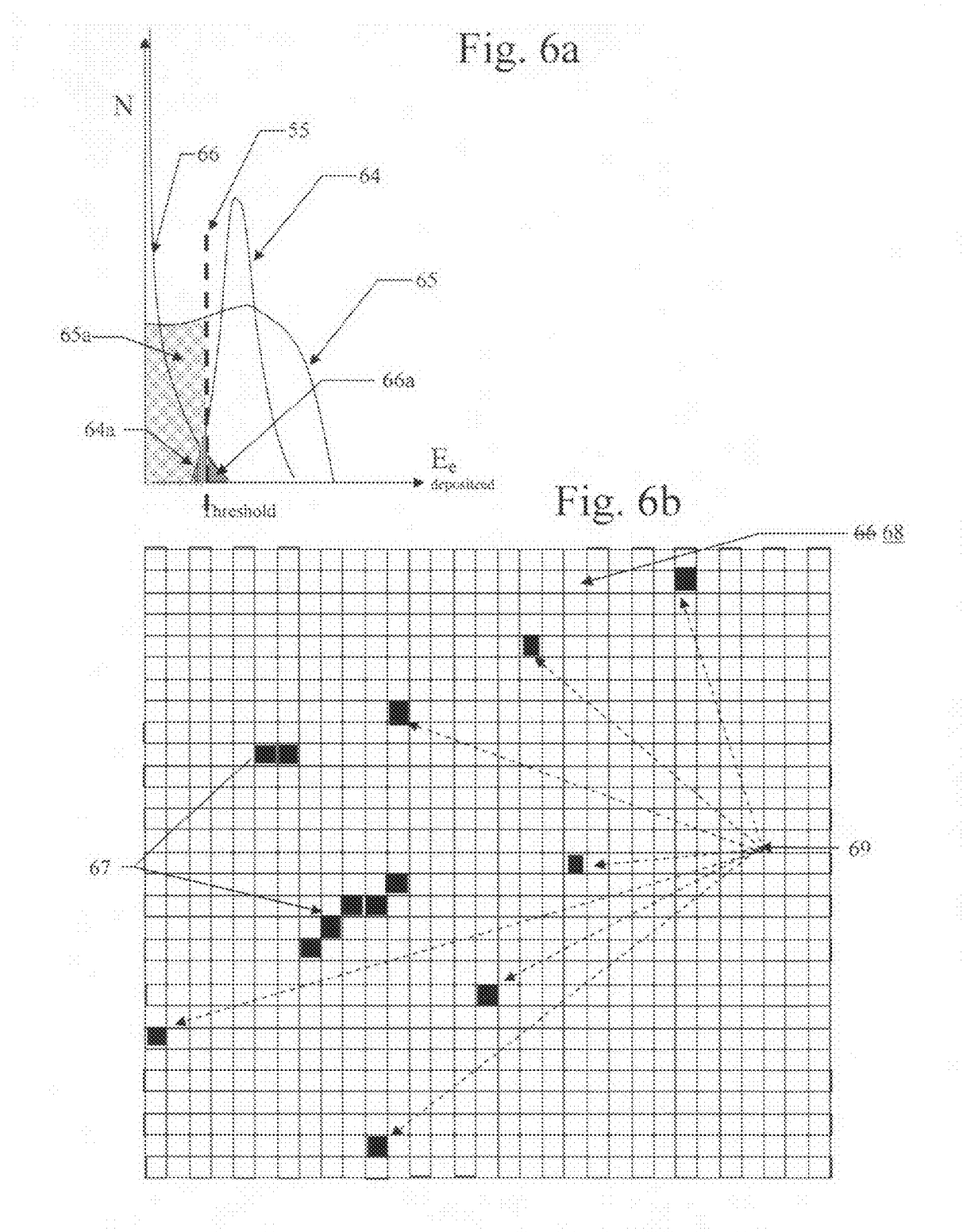

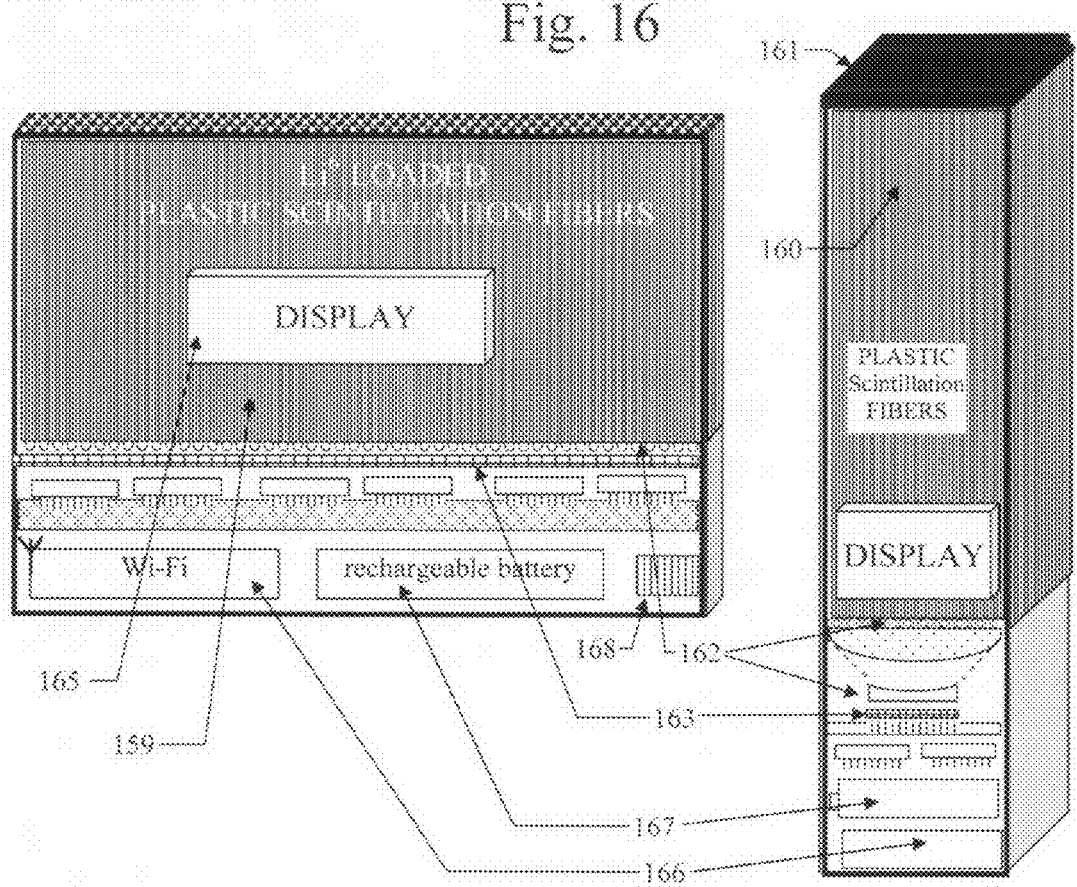

DIRECTIONAL NEUTRON DETECTOR

The application claims the benefit of the filing of U.S. Provisional Patent application 60/928,272 filed on May 9, 2007 titled Neutron Detectors and U.S. Provisional Patent application 61/065,623 filed on Feb. 14, 2008 titled Neutron-Gamma Detectors incorporated herein in their entirety by reference.

FIELDS OF SEARCH

Field of the invention: This invention relates to Neutron Detectors

RELEVANT PATENTS PATENT APPLICATIONS AND PUBLICATIONS

The patents and patent applications below are incorporated in this application by reference.

U.S. Pat. No. 7,335,891 Gamma and neutron radiation detector by Kniss, et al.

U.S. Pat. No. 7,304,309 "Radiation Detector" by Avraham Suhami

U.S. Pat. No. 7,145,149 Flexible composite radiation detector by Cooke, et al.

U.S. Pat. No. 7,141,799 Fiber optic thermal/fast neutron and Gamma ray scintillation detector, Neal et al.

U.S. Pat. No. 7,126,148 Neutron detection based on boron activated liquid scintillation by Murray, et al.

U.S. Pat. No. 7,057,187 Scintillator optical system and method of manufacture Yun, et al.

U.S. Pat. No. 7,046,284 CMOS imaging system with low fixed pattern noise by Kozlowski, et al U.S. Pat. No. 7,067,079 Extruded plastic scintillator including inorganic powders by Bross, et al.

U.S. Pat. No. 7,005,181 Organic, open cell foam materials, their carbonized derivatives, and methods for producing same by Albert, et al.

U.S. Pat. No. 6,989,541 Coincident neutron detector for providing energy and directional information by Penn, David G U.S. Pat. No. 6,943,390 High-gain photodetector with separated PN junction and rare earth doped region and a method of forming the same by Coffa, et al.

U.S. Pat. No. 6,927,397 Systems and methods for detecting neutrons by Bross, et al.

U.S. Pat. No. 6,921,909 Pixellated micro-columnar films scintillator by Nagarkar, et al.

U.S. Pat. No. 6,898,265 Scintillator arrays for radiation detectors and methods of manufacture by Mliner et al.

U.S. Pat. No. 6,892,011 Method and apparatus for fabrication of plastic fiber optic block materials and large flat panel displays by Walker, et al.

U.S. Pat. No. 6,884,994 High temperature scintillator by Simonetti, et al.

U.S. Pat. No. 6,881,959 Method and system for generating an image of the radiation density of a source of photons located in an object by Meng et al.

U.S. Pat. No. 6,859,607 Optical fiber, optical fiber cable and radiation detecting system using such by Sugihara et al.

U.S. Pat. No. 6,797,581 Avalanche photodiode for photon counting applications and method thereof by Vickers, James U.S. Pat. No. 6,775,348 Fiber optic scintillator with optical gain for a computed tomography system, and method of manufacturing same by Hoffman et al.

U.S. Pat. No. 6,744,052 X-ray pixel detector device and fabrication method by Peterson, et al.

U.S. Pat. No. 6,720,588 Avalanche photodiode for photon counting applications and method thereof by Vickers James U.S. Pat. No. 6,704,391 B2 System and method of aligning scintillator crystalline structures for computed tomography imaging by Hoffman, et al.

U.S. Pat. No. 6,685,870 Method and apparatus for manufacturing photonic crystal element by Ukechi, et al.

U.S. Pat. No. 6,496,632 Method of fabricating photonic structures by Borrelli, et al.

U.S. Pat. No. 6,470,127 Photonic band-gap light-emitting fibers by Voevodkin, George U.S. Pat. No. 6,409,907 Electrochemical process for fabricating article by Braun, et al.

U.S. Pat. No. 6,384,663 Circuit for high precision detection of the time of arrival of photons falling on single photon avalanche diodes by Cova, et al.

U.S. Pat. No. 6,358,854 Method to fabricate layered material compositions by Fleming, et al.

U.S. Pat. No. 6,271,510 Fiber optic Gamma camera having scintillating fibers by Boxen U.S. Pat. No. 6,090,674 Method of forming a hole in the sub quarter micron range by Hsieh, et al.

U.S. Pat. No. 6,080,989 Apparatus and methods for detecting and or imaging Gamma radiation by Royle, et al.

U.S. Pat. No. 6,072,224 Monolithic x-ray image detector and method of manufacturing by Tyson, et al.

U.S. Pat. No. 5,968,425 Methods for continuous production of plastic scintillator materials by Bross et al.

U.S. Pat. No. 5,772,905 Nanoimprint Technology by S. Y. Chou

U.S. Pat. No. 5,734,166 Low-energy neutron detector based upon lithium lanthanide borate scintillators by Czirr U.S. Pat. No. 5,606,638 Organic scintillator systems and optical fibers containing polycyclic aromatic compounds by Tymianski et al.

U.S. Pat. No. 5,554,850 X-ray scintillating plate utilizing angled fiber optic rods by Hejazi U.S. Pat. No. 5,420,959 High efficiency, high resolution, real-time radiographic imaging system by Walker, et al.

U.S. Pat. No. 5,391,878 Multiplexed fiber readout of scintillator arrays by Michael D. Petroff U.S. Pat. No. 5,334,839 Position sensitive radiation detector Anderson, et al.

U.S. Pat. No. 5,121,462 Process for production of scintillating optical fibers and optical fibers obtained Fabre, et al.

U.S. Pat. No. 4,803,366 Input screen scintillator for a radiological image intensifier tube and a method of manufacturing such a scintillator by Rougeot et al.

U.S. Pat. No. 4,421,671 Rare earth doped yttria-gadolinia ceramic scintillators by Cusano, et al.

U.S. Pat. No. 4,466,929 Preparation of Yttria Gadolinia ceramic scintillators by vacum hot-pressing by Greskovich, et al.

PATENT APPLICATIONS

US 20070029493 Gamma and Neutron Radiation detector by Kniss; Timothy Albert et al.

US 20060231742 Method and apparatus for providing non-linear, passive quenching of avalanche currents in Geiger-mode avalanche photodiodes by Forsyth; Keith W.

US 2006/0202129 Integrated circuit comprising an array of single photon avalanche diodes by Niclass; Cristiano; et al.

US 20060192086 Integrated imager circuit comprising a monolithic array of single photon avalanche diodes by Niclass; Christiano; et al.

US 20050224719 Neutron detector with layered thermal-neutron scintillator and dual function light guide and thermalizing media by Polichar et al.

US20050012033 Digital photon-counting geiger-mode avalanche photodiode solid-state monolithic intensity imaging focal-plane with scalable readout circuitry by Stern, Alvin et al.

US 2005/0265675 Method for producing parallel arrays of fibers by Welker, David J et al.

US2005/0207713 Subwavelength-diameter silica wires for low-loss optical waveguiding Mazur, Eric US 2005/0161611 Two-dimensional ionizing particle detector by Disdier, Laurent et al.

US 2004/0031435 Method for fabricating optical fiber preform using extrusion die by Park, Yong US 2003/0183772 Thick scintillation plate with internal light collimation by Schreiner, et al US 2003/0168756 Electrospinning of polymer and mesoporous composite fiber by Balkus, Kenneth J. J R. et al.

OTHER PUBLICATIONS

Gadolinium-Loaded Plastic and Rubber Scintillators by Zane W. Bell; work under U.S. Department of Energy contracts DE-AC05-84OR21400 and DE-AC05-96OR22464.

Development of Gadolinium Pyrosilicate Powder Scintillator for Neutron Science by J. H. Kaneko et al, NSS-MIC 2005 meeting, session 38

Photonic Crystal Scintillating Fibers, by George Voevodkin, Intelligent Optical Systems, Inc., Lett. 58, 2486-2489 (1987).

Development of Gadolinium loaded liquid scintillator for solar neutrino detection and neutron measurements by P/K Lightfoot et al. Nuclear Instruments and Methods in Physics Research A 522 (2004) 439-446

Boron loaded plastic scintillator applied to active neutron measurements of waste drums. Stèphane Normand et al. IEEE Nuclear Science Symposium and Medical Imaging Conference (NSS/MIC-2004) 16/10/2004

Thermal neutron detection using boron-10 and sodium salicylate doped epoxy films by Hayn Park, B. A. thesis Harvard University, 1996

A class of boron-rich solid-state neutron detectors by B. W. Robertson, et al. APPLIED PHYSICS LETTERS VOLUME 80, NUMBER19 13 May 2002

Study of a new boron loaded plastic scintillator by Normand, S. et al Nuclear Science, IEEE Transactions Volume 49, Issue 4, August 2002

"A new fabrication technique for photonic crystals: nanolithography combined with alternating-layer deposition," S. Kawakami, et al. Opt. Quantum Electron. 34, 53-61 (2002).

"Formation of nanofiber crossbars in electrospinning" by Zussman et al. Appl. Physics letters. Vol. 82 No. 6

Large Area Avalanche Photodiodes Challenge PMTs—B. Koren and M. Szawlowski, Advanced Photonix, Inc., Camarillo, Calif.

Recent Advances in Avalanche Photodiodes by J. Campbell et at IEEE Journal of selected topics in quantum electronics VOL. 10, NO. 4, July/August 2004 p. 777

Crystal Fiber technology; by Broeng et al. Technical University of Denmark www.crystal-fibre.com/publications/broeng_dopsnyt0200.pdf Silica Aerogels—M. Ayers, http://eetd.lbl.gov/ECS/aerogels/satoc.htm Light conversion efficiency of small lithium scintillators for electrons protons, deuterons and alpha particles", A. W. Dalton, Nucl. Instr. Meth. A 254, pp. 361-366, 1987.

Premium Plastic scintillators response to Atomic particles—Saint-Gobain Crystals Patent application Ser. No. 11/820,700 filed on Jun. 20, 2007 "Radiation Camera" by Avraham Suhami All the patents, patent applications, provisional patent applications and documents cited above are incorporated in this application by reference.

BACKGROUND

Neutron sources are always accompanied by Gamma and X-ray radiation, either as a result of the primary reaction or emitted by the materials surrounding the primary neutron source. Thermalized fast neutrons when captured are usually accompanied by X and/or Gamma rays. In addition there is the background radiation that often is higher than the neutron flux. Thus the main challenge of neutron detection is the elimination or differentiation from Gamma and X-rays.

Low energy Gamma rays interact with matter mainly by one of the 3 effects, the photoelectric, the Compton or the pair production effects.

The energy transfer from a hard photon (hv) to an atomic electron (e) in the photoelectric effect is given by $E_e = h\nu - E_b$ where $E_b$ is the binding energy of the electrons of the stopping material. The atom excited by the stripping of one of its electrons, returns to its stable state by emitting one or more X-rays whose energies are determined by its discrete energy levels and denoted accordingly as the M, L or K X-rays.

In the Compton effect which is dominant at medium energies and low Z elements, the incoming photons are scattered by the electrons of the stopping material, imparting them part of their energy. The energy of the scattered Gamma ray (1) when the electron is considered to be at rest, is given by $$E_1 = h\nu' = m_e c^2 / [1 + \cos\theta + (m_e c^2 / E_0)]$$

or $\cos\theta = 1 - (m_e c^2 / E_e) + (m_e c^2 / E_1 + E_e)$ the recoil electron's energy is given by $$E_e = h\nu' = [(h\nu)^2 / m_e c^2 (1 - \cos\theta)] / [1 + (h\nu / m_e c^2)(1 - \cos\theta)]$$

The maximal energy of the recoil electron is therefore at $E_e \max = E / (1 + m_e c^2 / 2E)$ The recoil angle $\phi$ of the electron, relative to the direction of the impinging Gamma ray, is given by $$\cot\phi = 1 + (h\nu / m_e c^2) \tan(\theta/2)$$

It is important to note that following the momentum equalities, the incoming Gamma ray, the scattered Gamma ray and the recoil electron are all on the same plane.

The differential cross section of the Compton Scattering for unpolarized photons is given by the Klein-Nishina equation:

$$[d\sigma/d\Omega] = (r_e^2/2)(\nu'/\nu)^2[(\nu/\nu') + (\nu'/\nu) - \sin^2\theta]$$

where $r_e = (e^2/m_e c^2)$ is the "classical" radius of the electron equal to $2.82 \times 10^{-13}$ cm.

This equation which assumes scattering by free electrons, has to be modified by a form factor $S(k,k')$ at energies where the binding energies of the electrons become important, as compared with the energy of the Gamma ray, causing the angular distribution in the forward direction to be suppressed. The binding energies of the electrons in a plastic are low, 13.5981 eV for the electron in a H atom and in a carbon atom 288 eV for the inner is electron, 16.6 eV for the 2s electrons and 11.3 eV for the 2p electrons. Thus in a Compton scattering of a 140 keV Gamma ray by a plastic scintillator, the highest energy of scattering K electrons is 0.2% and may be viewed practically as at rest; the resultant X-Ray in practice is unobservable.

In the pair production effect the two 511 keV hard photons generated by the annihilation of the positron, again interact with the stopping material through the Compton or Photoelectric effects and cause ejection of electrons and their eventual absorption, as explained above.

As described above a Gamma ray will interact with a scintillator through one or several of the Photoelectric, Compton or Pair production processes. At the end of each of the processes the energy is transmitted to an electron that spends this energy exciting successive atoms of the material The electrons so produced by the three processes loose energy mainly by Coulomb scattering until they eventually stop. If the stopping medium is a scintillator the excited electrons and the holes along the track form excitons that drift in the scintillator until they excite a color center which when deexcited emit low energy photons in the visible range. If the stopping medium is transparent to these photons, they can emerge from it and be detected by a photon detector such as a photomultiplier tube or a photo-diode.

The loss of energy (dE/dx) by an ionizing particle, other than electrons, in a material of atomic number Z is given by the Bethe-Bloch equation $$-(dE/dx)=(4\pi/m_e c^2)(nz^2/\beta^2)(e^2/4\pi\epsilon_0)^2[\ln\{2m_e c^2\beta^2/I(1-\beta^2)\}-\beta^2]$$

where $\beta=v/c$, E=energy of the particle, z=the charge of the particle, and I=the mean excitation energy of the target. n=the electron density of the target given by $(NZ\rho/A)$ where N is the Avogadro number and Z, $\rho$ and A are the atomic number, the density and the mass number of the target respectively. The stopping power and Range of protons and alpha particles is tabulated in the databases PSTAR, and ASTAR of NIST (National Institute of Science and Technology), according to methods described in ICRU (International Commission on Radiation Units) Reports 37 and 49. The stopping power of electrons is adequately described by Coulomb scattering and tabulated in ESTAR tables of MST and ICRU-37. In low Z materials and low energies in the $0.01 \leq E \leq 2.5$ MeV an electron's range R (expressed in g/cm² units) may be approximated by the empirical formula $$R=0.412E^{1.27-0.0954\ln E}$$

where E is the kinetic energy of the electron in units of MeV

The most prevalent thermal neutron detectors consist of pressurized $He^3$ and $BF^3$ gas detectors that detect the ionizing particles formed in the reactions $He^3+n \rightarrow H^3+p$ and $^{10}B+n \rightarrow Li(0.84 \text{ MeV})+^4He(1.47 \text{ MeV})+\gamma(0.48 \text{ MeV})$ Solid-state semiconductor neutron detectors—using various semiconductors incorporating Boron, Cadmium, Gadolinium and Lithium or deposited as a conversion layer on top of a Si diode 215 have been constructed. Notwithstanding the technological problems associated with the specific semiconductors, such p-n diodes are inherently small; consequently they have low efficiencies to detect neutrons.

Neutron detectors may be constructed by using photomultipliers or photodiodes to detect the scintillations generated within a liquid scintillator loaded with Boron, when a thermal neutron is catured. Liquid scintillator loaded with up to 10% Boron in weight, are commercially available from Saint-Gobain (BC-454).

Neutron Detectors formed in polyvinyl toluene and silicone rubber-based solid scintillators loaded with 1% gadolinium are described by Zane W Bell from Oak ridge National Labs. P. K. Lightfoot et at have shown liquid scintillators based on α-hydroxytoluene loaded with up to 10% by weight of gadolinium.

Gadolinium Pyrosilicate ($Gd_2SiO_5$) and Gadox (GSO) scintillators can be used as very efficient thermal neutron detectors, but are also sensitive to Gamma rays.

N. Mascarenhas et al. from Sandia have shown a Neutron Detector composed of 500µ square plastic scintillator fibers detecting the recoil protons of high energy fast neutrons. However such thick fibers cannot minimize the sensitivity to Gamma radiation and the detector built with such thick fibers cannot be inherently directional, without imaging the track of the recoil proton.

Neal et al. from PNNL/Battelle have built fast/thermal neutron detectors using glass scintillator fibers containing $Li^6$ surrounded by plastic scintillator acting both as moderator and detector of the recoil protons created after a fast neutron scattering and the thermal neutrons following the reaction $Li^{6}+n \rightarrow He^4(2.05 \text{ MeV})+H^3(2.73 \text{ MeV})$.

However to the best of our knowledge there are no neutron detectors built out of scintillation fibers whose thicknesses are less than 100µ, the track lengths of the protons, alphas and tritons produced by neutrons interacting with hydrogenous scintillators or scintillators loaded with Li or Boron

SUMMARY OF THE INVENTION

Throughout this patent application the term "fiber" will be used to describe long and thin solid scintillation materials optically transparent to their scintillation wavelengths where their substantially straight length is much larger than their cross-section and where said cross-section may be circular, rectangular or of any closed shape.

The essence of the strategy in designing the proposed high-efficiency Neutron detector with low efficiency to Gamma rays, consists in differentiating geometrically the signals generated by the ionizing particles following neutron interactions, whether thermal, epithermal or fast, from the signals created by the electrons created by Gamma/X-Ray interactions with the detector. This geometric differentiation consists of the great differences of the respective track lengths of electrons and the heavy ions, protons, deuterons, tritons and alpha particles.

This differentiation is achieved by building the large volume detector out of very thin scintillation fibers that can fully absorb the heavier-than-electron particles, while electrons created by the Gamma rays traversing said thin scintillators having much longer ranges than the diameters of the fibers, deposit little energy in it.

If the ionizing radiations created following the neutron capture have ranges smaller than the diameter of the fibers, they will be absorbed within a single fiber or at most within two adjacent fibers. Gamma rays on the other hand when scattered or absorbed will create electrons whose tracks are much longer than the heavy particles and will cross several fibers, dividing their energy between them. The exception to this principle are gamma rays that emit electrons whose tracks are along the fibers; the probability of such events may be shown to be small.

Interrogating each scintillation fiber separately by a photodiode coupled at its end, differentiates between the heavier particles and electrons by their pulse height. Alternatively or in addition, observing the number of adjacent fibers traversed by ionizing particles and the deposited energy enables to differentiate between electrons and heavy particles.

As electrons generate a larger number of photons than heavier particles of the same energy, low energy Gamma or X-rays absorbed in a single fiber will give a signal that may be interpreted as a heavier particle if they produce the same number of photons although they may deposit vastly less energy. A properly adjusted discriminator following each photodiode, is able to differentiate between the low photon count signals characterizing traversing electron tracks, from the higher photon count signals characterizing protons, tritons and alphas produced by neutrons reacting with the fiber material.

Thus it is important to first minimize the thickness of the fibers, so that they will fully absorb the heavier particle(s) while extracting from the traversing electron a minimal energy. Thus the optimal diameter of the fibers is approximately equal to twice the range of the heavier particles traversing or created in them.

The detector constituted from thin plastic scintillator fibers may be used as a fast neutron detector with very low Gamma detection efficiency if the discriminator is placed at a level above the energy deposited by electrons traversing a single fiber. The optimal level of the discriminator commensurate with elimination of the Gamma ray sensitivity is dependent on the Neutron and Gamma spectra The detector may also detect thermal and epithermal neutrons if the plastic scintillator fibers are loaded with $B^{10}$ or $Li^6$. Loading with $Li^6$ is the preferred implementation as it creates higher energy secondary particles that are easier to differentiate from electrons created by Gamma rays.

The detector may also be used as a Gamma ray detector by loading the plastic scintillator with a heavy element such as lead (Pb) or a scintillator such as $PbWO_4$ or $CdWO_4$. Setting the discriminator above the noise level will detect both gamma rays and neutrons while setting it above the level of the maximal energy that may be deposited by traversing electrons, will enable to measure only the number of neutrons; the difference between the two will give the number of Gamma/X rays.

The invention also describes several methods of fabrication of thin scintillation fiber arrays. One method consists in extruding the scintillation fiber array through a perforated plate.

A second method consists of electrically drawing thin filaments of the fiber material, in parallel, from a reservoir of dissolved polymerizable material.

A third fabrication method consists in extruding fibers through an array of orifices or capillary tubes and thinning them by pulling; the fibers are then deposited on a square spool turning and advancing gradually until one linear array is deposited. A thin film is then deposited on the linear array and the operation repeated, depositing one linear array on the previous one until the desired array is obtained. The thick array covering the 4 sides of the turning square spool is then cut to size, into 4 arrays.

A fourth method consists in depositing a plastic scintillator mixture still in liquid state, into thin parallel closely spaced slots carved into an hydrophobic substrate and letting it to polymerize in situ; various curing methods may be used to accelerate the polymerization process. The fibers may then be lifted out of the slots, thus obtaining a linear array of closely spaced thin fibers. The 2D arrays may then be stacked, one on top of the other, by pick-and-place robotic means, while depositing after each 2D array a thin layer of aerogels that separate between the layers.

The parallel slots may be fabricated by milling an hydrophobic subtrate or imprinting an hydrophobic substrate with a parallel array of heated thin metallic wires; retrieving the wires creates in the substrate the desired array of closely packed slots.

An important feature of the fiber arrays is the filling of the space between the fibers by several micron sized aerogels. This structure equivalent to "air" cladding of the plastic core, enables a large proportion of the scintillation photons to stay and propagate within the fiber and minimize the cross-talk with adjacent fibers.

To increase the neutron detection efficiency while decreasing gamma detection efficiency it is useful to surround the neutron detector with a lead (Pb) lining. While the lead lining will absorb some of the gamma/x rays, it will also amplify the neutron flux due to the (n, 2n) reactions in lead, specially due to the $[Pb^{206}+n \rightarrow Pb^{205}+2n]$ reaction, as $Pb^{206}$ constitutes 24% of natural lead.

BRIEF DESCRIPTION OF THE DRAWINGS

The drawings of the application are not intended to portray the specific parameters or the structural details of the invention and are not to scale, but merely schematic representations of the invention, which illustrate to persons skilled in the art the main details of the invention after reading the information contained herein.

FIG. 3b illustrates an array of close-packed plastic scintillation fibers connected optically to a photodetector array of smaller dimensions by a combination of refractive and diffractive lenses

FIG. 6a illustrates the distribution of Gamma and thermal and fast Neutron events as a function of their Track length and energy deposited per unit of track length FIG. 6b illustrates the image obtained after one frame by a photodetector array coupled to the fiber array where the signals are above a given threshold.

FIG. 16 illustrates two structures of the Neutron detector, each optimized for different uses and incorporating the fiber array, the optics, the digital sensor, the hard wired data processor and the control electronics.

DETAILED DESCRIPTION OF THE PREFERRED EMBODIMENTS

Figure 1:
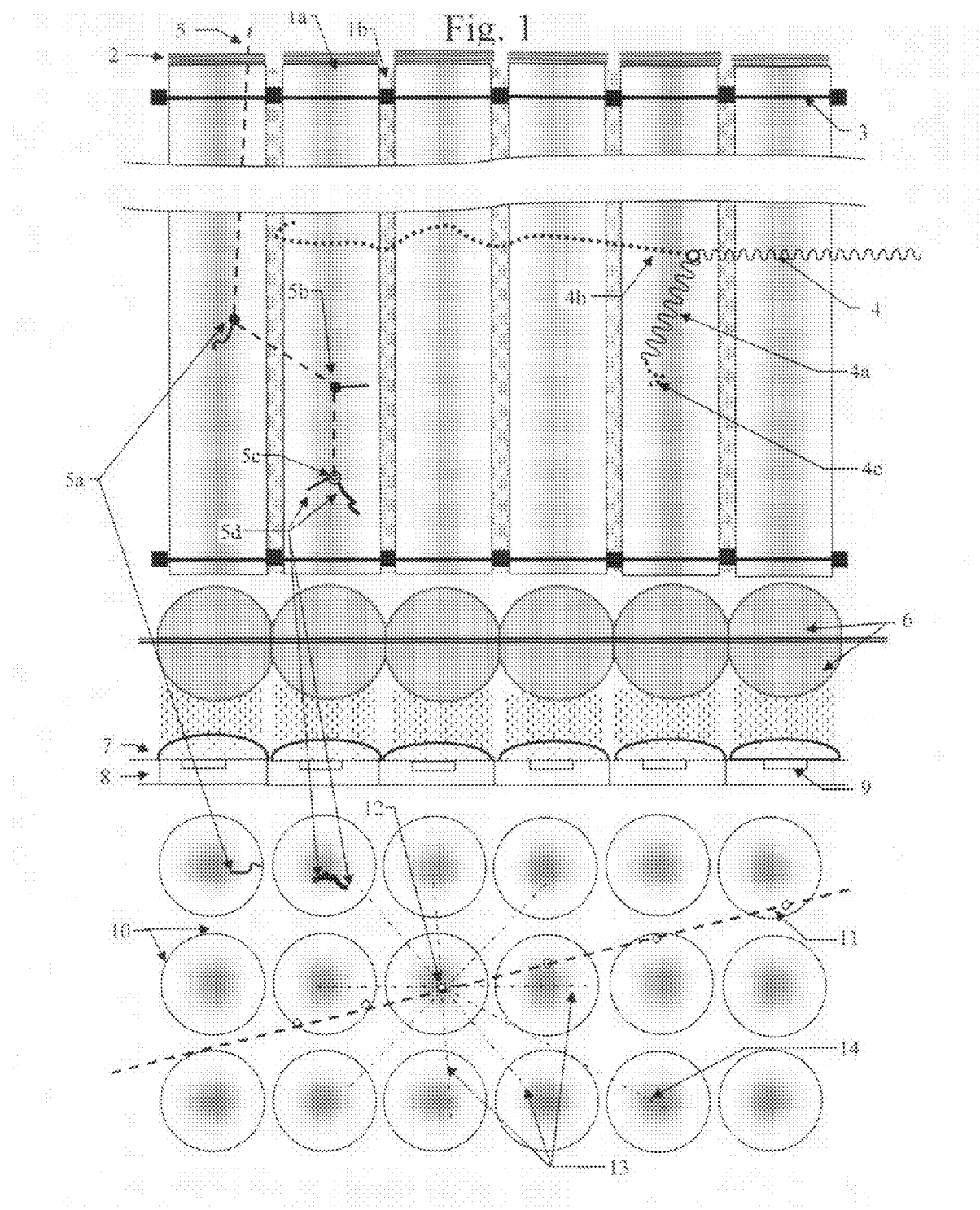
FIG. 1 illustrates the structure of a fast and thermal Neutron detector consisting of an array of straight and very thin scintillations fibers loaded with high thermal neutron capture element such as $Li^6$ and separated by aerogel particles, directly coupled through two lenslet arrays to a photodetector array of the same cross section dimensions.

FIG. 1 illustrates a fast and thermal Neutron detector consisting of an array of straight plastic scintillations fibers 1a, loaded with a material that has a high thermal neutron cross section, coupled optically to a photodetector array 8. The beam of photons exiting the fibers are first collimated by two arrays 6 of semi-ball lenses placed back-to-back so that their combined effect is like full ball-lenses. The collimated beams are then focused onto the active areas 9 of each photodetector pixel by a lenslet array 7 attached or deposited on the photodetector array 8, such as a CMOS or CCD active pixel array. One end of the fiber is coated with a dielectric or metallic mirror 2 that reflects the scintillation photons back to the other end. The width of the scintillation fibers is determined by the range of the protons scattered by the neutrons and the range of the heavy particles, tritons and alphas created by the specific thermal neutron capture reaction of the material loaded onto the plastic scintillator, so as to maximize their detection while minimizing the detection of Gamma rays.

Figure 10:
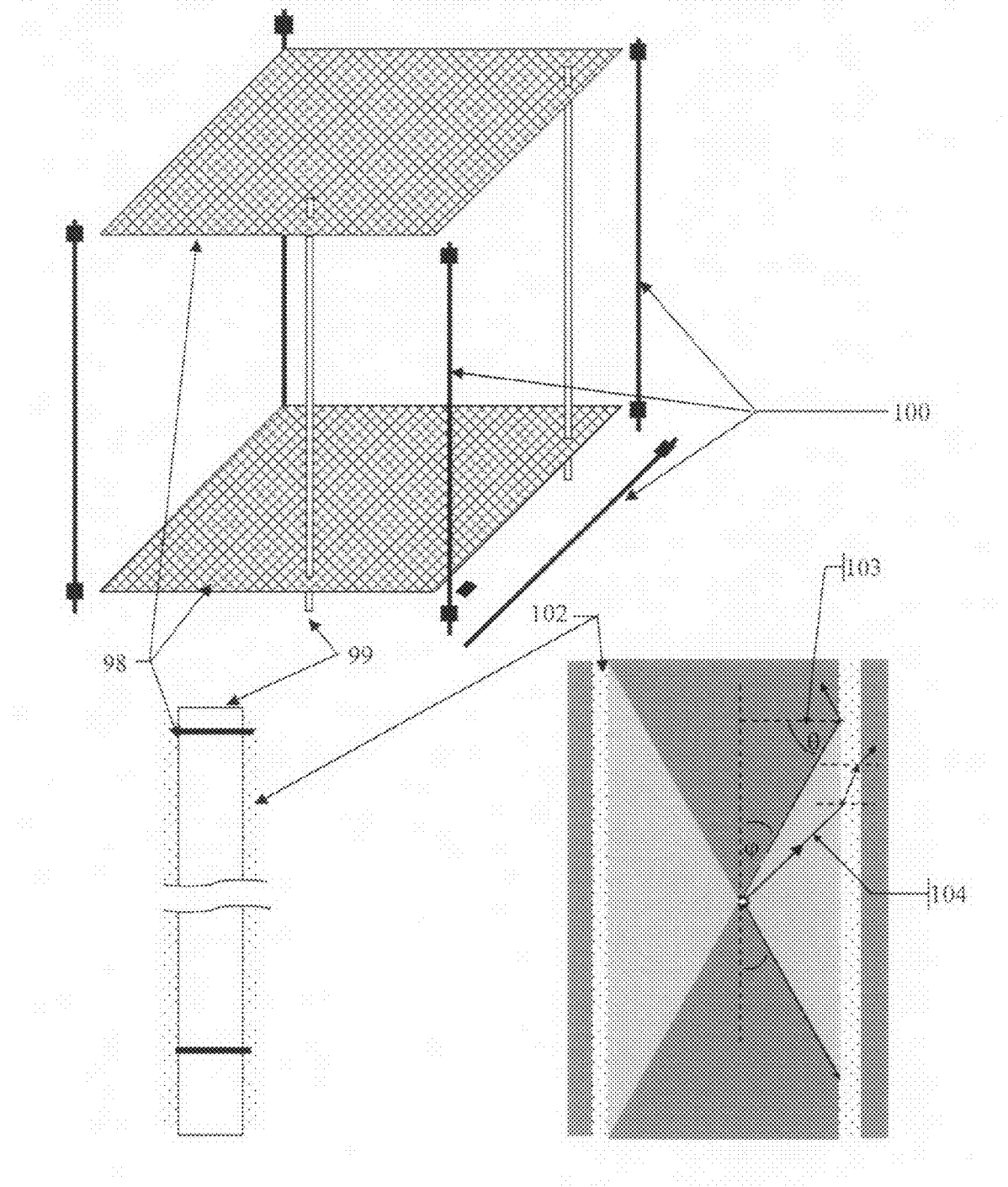
FIG. 10 illustrates a 3D fiber array held together by two mechanically connected meshes.

The percentage of scintillation photons generated in a fiber, traversed by a track 11 FIG. 1, that will propagate to the ends of a fiber is determined by the critical angle depending on the refractive index contrast between the fiber and its coating as illustrated in FIG. 10. For a vinyl toluene based plastic scintillator with refractive index of $n_0=1.58$, a teflon coating with $n_1=1.3$ or a very low density aerogel 1b with $n_1=1.05$ will result in 18% and 33% of the photons respectively, to propagate within the fiber. If one of the ends of the fibers is coated with a dielectric mirror 2 reflecting back the photons, all the critically reflected photons exit the fiber 12 in FIG. 1 through the other end. The rest of the photons 104 FIG. 10 or 13 in FIG. 1, exit the fiber and reach the 1st ring of 8 fibers and through the interstices to the next ring of 16 fibers 10, 14, surrounding them. A portion of the photons that penetrate the adjoining fibers will also exit them, for the same geometrical reasons, and will further scatter to the next ring and beyond. Thus the number of stray photons in each fiber able to propagate to its end will be a small fraction of the photons generated inside the original fiber and may be eliminated electronically by a discriminator. The fibers are held together at a small distance each of the other by two meshes 3 FIG. 1, 98 FIG. 10 ensuring that most of the fiber is surrounded by aerogel or air.

FIG. 1 shows a fast neutron 5 entering the detector, twice scattered by protons 5a and 5b and the decelerated neutron absorbed by a $Li^6$ nucleon 5c that has a resonance at 250 keV emitting two heavy by-products 5d, an alpha and a triton.

The fast neutron scattering cross section in a plastic scintillator which is composed of 50% of hydrogen is ~4 barns ($4.10^{-24}$ cm$^2$) for ~1 Mev Neutrons and drops to ~1 barn for 2.5 MeV neutrons. Neutrons less than 1.5 MeV constitute approximately 40% of the total number released in a fission reaction while 90% of all the neutrons in a fission (Watt) reaction are less than 2.5 MeV.

In a 1 cc of plastic scintillator weighing 1.03 g there are $(1.03)(1/13)\times 6.10^{23} \cong 4.7\ 10^{22}$ H atoms/cm$^3$. The cross section for 1 Mev neutrons in H being $4.10^{-24}$ cm$^2$, in 1 cc of plastic scintillator there will be 0.188 interactions/cm; in other words the mean free path of the 1 MeV neutrons in plastic scintillator is ~5.2 cm. As the 2.5 MeV neutrons have a cross section of 1 barn the mean free path will be ~21 cm. Thus in a (2")$^3$ cube of plastic scintillator there will be on the average ~1-2 fast neutron interactions. Larger scintillators will generate proportionally larger number of detected scattering events. The exact number depends on the neutron spectrum.

After each collision with a proton of the Hydrogen atom, the energy of the neutron is reduced on the average by half. To thermalize a fast neutron requires approximately 25 scatterings; assuming a random direction after each scattering, the fast neutrons will have to travel approximately 5 mean free paths, to reach thermal energies, where it can be captured by a high-thermal neutron-capture cross section material such as Boron, Lithium or Gadolinium. However fast neutrons decelerated 2-3 times only may be captured by a $Li^6$ nucleon that has a resonance at 250 keV of 4 barns.

Boron 10 loaded plastic scintillators may be used to detect thermal neutrons through the reactions 94% of the time $B^{10}+n \Rightarrow Li^7(0.84\ MeV)+He^4$ (1.47 MeV)+$\gamma$(0.48 MeV) and 6% of the time $B^{10}+n \Rightarrow Li^7(1.02\ MeV)+He^4$ (1.78 MeV)

as illustrated in FIG. 1 5d, the reaction products which in this case are $Li^7$ and $\alpha$ have short ranges and are absorbed within a single fiber.

However the preferred method to detect thermal neutrons is by loading plastic scintillators with $Li^6$ and detecting the alphas and tritons created through the reaction $Li^6+n \rightarrow He^4(2.05\ MeV)+H^3(2.73\ MeV)$.

In this case the ranges of the $\alpha$ and triton would be 10µ and 34µ respectively.

Heavy particles exert a higher quench effect on the scintillation process in plastic scintillators; the ratio of the effective scintillation efficiencies in a plastic scintillator are estimated to be

|  | electron | proton | Triton | alpha | Li$^7$ |
| --- | --- | --- | --- | --- | --- |
| Ratio of "electron equivalent energies", quenching factor | 1:1 | 1:4 | 1:8 | 1:20 | 1:50 |

We therefore can define a combined "electron-equivalent-energies" of the heavy by products in the thermal neutron capture reactions, for calculating their scintillation outputs as compared to the electrons of the same energy generated by Gamma rays interacting with the scintillator.

In the reaction $Li^6+n \rightarrow H^3+\alpha$ the combined "electron equivalent energies" of the triton and α is 440 keV approximately. As the triton and α are rarely co-linear, both particles would be absorbed most of the time in a fiber of 50μ to 100μ.

FIG. 1 also illustrates the much longer ranges of electrons 4b created by the Compton scattering of Gamma ray 4 and the short electron track 4c generated by the photoelectric absorption of gamma ray 4a in a plastic scintillator.

For a neutron scattered by a proton in a plastic scintillator the energy of the proton is given by $E_p = E_n \cos^2\theta$ where θ is the scattering angle from the direction of the impinging neutron; a proton recoiling in the forward direction absorbs all the energy of the neutron, the proton scattered at 90° doesn't get any of the energy and a proton recoiling at 45° is imparted 50% of the energy.

| PRIMARY RADIATION | 1 MeV neutron | | 2 MeV neutron | | 4 MeV neutron | | 8 MeV neutron | | |
|---|---|---|---|---|---|---|---|---|---|
| Proton scattering angle | 0° | 45° | 0° | 45° | 0° | 45° | 0° | 45° | 60° |
| Proton energy (in MeV) | 1 | 0.5 | 2 | 1 | 4 | 2 | 8 | 4 | 2 |
| Range in plastic scintillator | 31μ | 15μ | 79μ | 31μ | 242μ | 79μ | 820μ | 242μ | 79μ |
| Energy deposited in 50μ track* | | | | | 1.6 MeV proton ≈ 400 keV electron | | | | |
| Energy deposited in 100μ track* | | | | | 2.4 MeV - proton ≈ 600 keV - electron | | | | |

Figure 2:
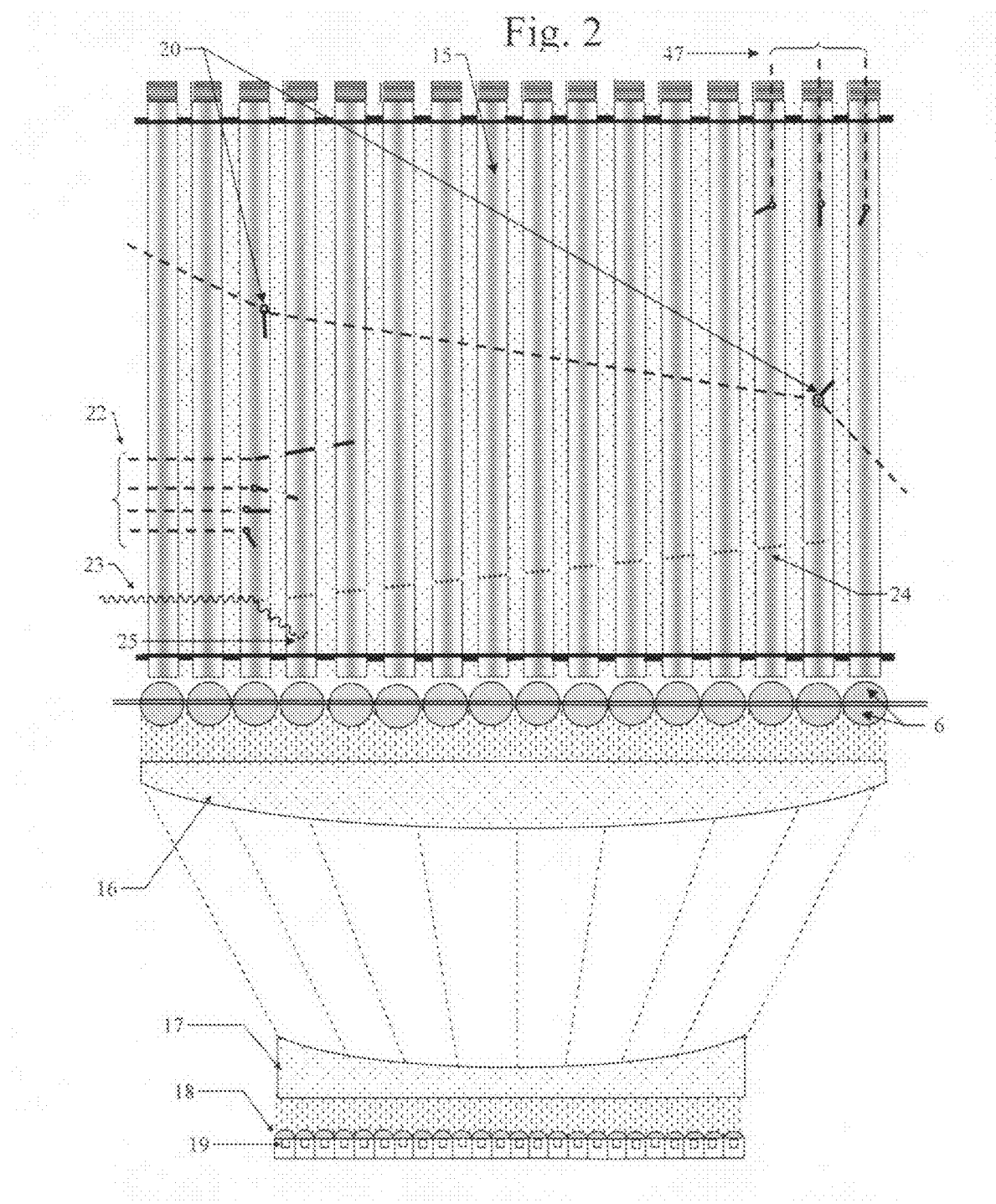
FIG. 2 illustrates the structure of a Neutron detector consisting of an array of straight and very thin plastic scintillation fibers coupled optically to a photodetector array of smaller dimensions.

*for 100μ thick fibers, and a (250 keV electron ≈1 MeV proton) discriminator:

FIG. 2 shows the structure of a Neutron detector consisting of an array of thin plastic scintillation fibers 15 coupled optically to a photodetector array of smaller dimensions. Neutrons traversing the detector generate short proton recoils 20, 21, 22 while a compton scattered gamma ray 23 generates electrons 24 and 25. To reduce the size of the optical image exiting the fiber array and match it to the size of the sensor array requires a combination of lenses that reduces the image without distortion. A concave lens 16 reduces the collimated beams exiting the array of ball-lenses. A convex lens 17 then collimates the beam and projects it onto the photodetector array 19 covered by semi-spherical lenslets 18 that focus the beams onto the respective active areas of each pixel.

Assuming 8 photons per keV of a plastic scintillator and 30% of the photons channeled to the fiber's output, a 250 keV electron-equivalent particle will generate 600 photons at the output of the fiber. The optical reduction is estimated to reduce the number of photons by less than 50%. Given a QE of 30% for the 420 nm photons, approximately 90 photo-electrons will reach the CMOS sensor.

Figure 3A:
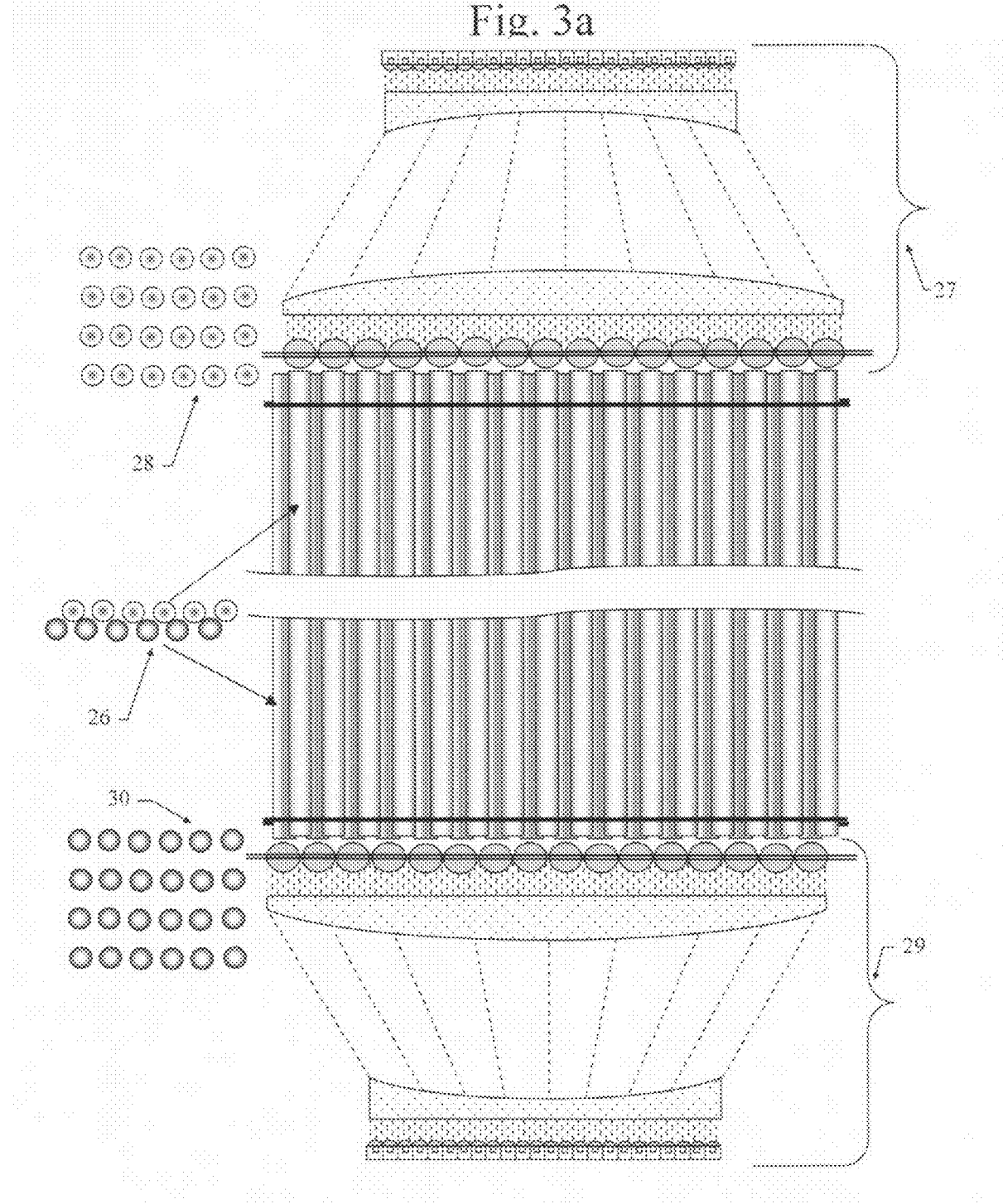
FIG. 3a illustrates an array of close-packed plastic scintillation fibers connected optically to 2 photodetector arrays of smaller dimensions at both ends

FIG. 3a illustrates the optical connection of the opposite ends of a close-packed scintillation fiber array 26 to two photodetector arrays of smaller dimensions through separate optical couplings 27 and 29. This structure preserves the higher density of closed-packed fibers while enabling to connect alternate rows of fibers 28, 30 to digital opto-sensors whose pixels are on a regular X-Y grid. FIG. 3b illustrates the optical coupling of an array of closed-packed fibers 32 to an opto-sensor array whose pixels are on a regular X-Y grid 35 by a combination of refractive 34 and diffractive 33 lenses who transform differently the direction of the optical outputs of alternating rows of fibers.

The larger surface of the fiber arrays may also be coupled to a smaller opto-sensor array using a taper. A taper may be fabricated by first softening the tips of the fibers in the fiber array, by heating them with a heat source; pulling them will gradually thin and taper each fiber. Squeezing the array on the 2 lateral dimensions, will form a square taper as an extension of the scintillation fiber array.

Figure 4A:
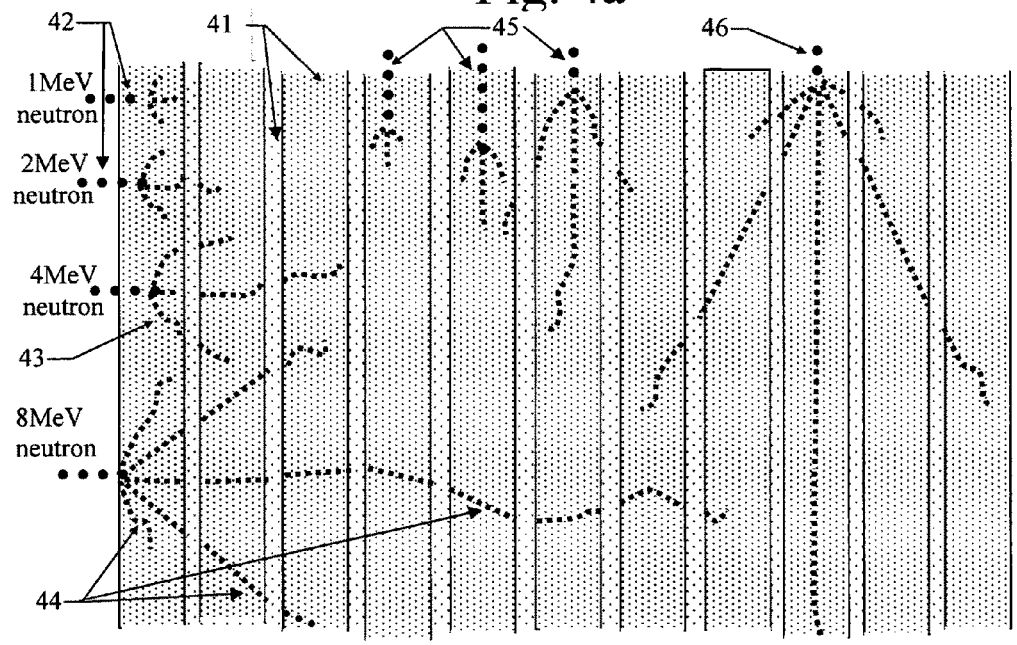
FIGS. 4a and 4b illustrate the tracks of Neutron created protons and Gamma ray created electrons, in plastic scintillation fiber arrays.

FIG. 4a illustrates the absorption of proton tracks created by 1 MeV and 2 MeV neutrons 42, substantially within the 100μ thick fibers 41 separated by aerogel, and the tracks of 4 MeV and 8 MeV neutrons, hitting the fibers from a lateral direction 43, 44 or from the same direction as the long dimension of the fibers, 45, 46.

DIRECTIONALITY—

The above table shows that in the case that the neutron beam's direction is orthogonal to the long direction of the fibers, neutrons up to 2 MeV which constitute ~50% of the fission Watt spectrum, are fully absorbed in the 100μ fiber, whether transfering all their energy to forward moving protons or kicking the protons sideways. However if the interaction occurs near the edge of the fiber, some of the protons may cross over and loose their energy in two adjacent fibers. Depending on the discriminator/comparator level, either one or two signals in adjacent pixels will be registered. Neutrons of energy higher than 2 MeV 43, 44 will deposit their energy in more than one fiber in most cases and consequently signals from two or more adjacent fibers will be registered, although such higher energy neutrons have smaller cross sections and much longer mean free paths (as long as 20 cm) and their probabilities of being detected strongly decreases as a function of total detector width. We conclude therefore that if neutrons>1 MeV come normal to the fibers' direction, many protons will cross several fibers.

In the case that the neutron beam's direction is in the long direction of the fibers, most neutrons of up to 4 MeV will transmit to forward and sideways scattered protons 45, all their energy within one fiber. Neutrons higher than 4 MeV and up to 8 MeV 46 transmitting their energy to forward and more than 60° sideways scattered protons, will also deposit their energy in one fiber; protons scattered sideways around 45° will deposit their energy in more than one fiber.

We may conclude therefore that more tracks formed by neutrons coming in the direction of the fibers will deposit their energy within one fiber, than neutrons coming in a direction normal to the long direction of the fibers. Thus Directionality may be defined as the ratio of the # of tracks ending within a single fiber, to that crossing several adjacent fibers, provided that the surfaces facing the neutron flux, as well as the traversed thicknesses of the detector, are equal. The exact Directionality factor depends on the Neutron spectrum, the thickness of the fibers and the setting of the discriminator/comparator. The directionality may also be enhanced or reduced by the dimensions of the detector.

Figure 4B:
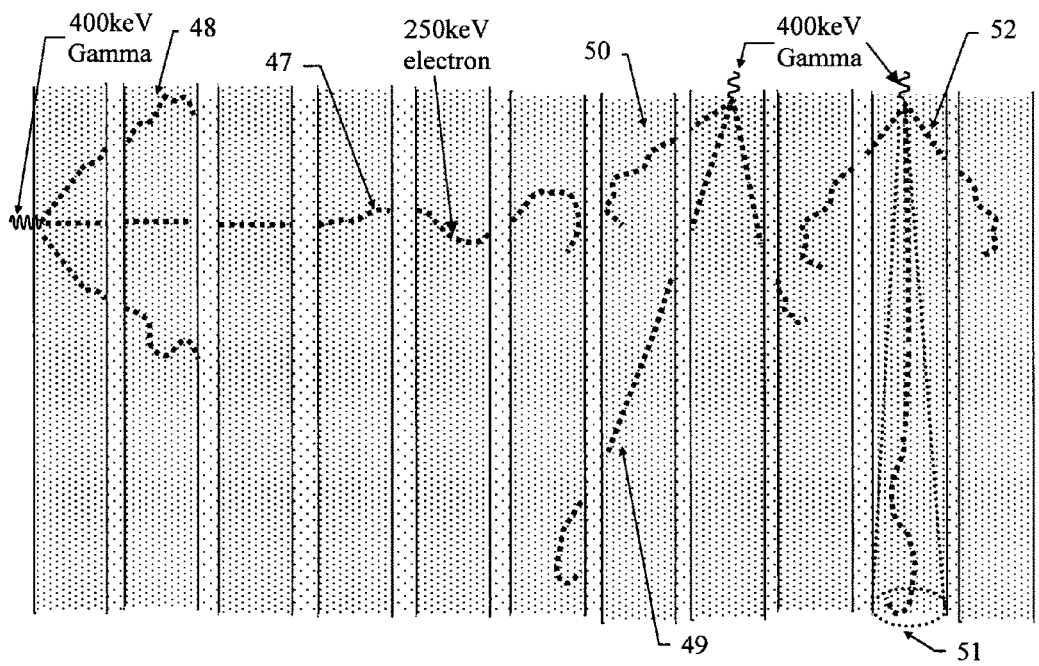

FIG. 4b illustrates the tracks of 400 keV Gamma ray created electrons, traversing thin plastic scintillation fibers in the direction of the gamma ray coming normal to the long direction of the fibers 47 or at 45° from it 48. It also illustrates the tracks of 400 keV Gamma ray created electrons in the direction of the Gamma ray coming in the same direction of the fibers 51 or at 45° from it 52. It also illustrates the tracks of 400 keV Gamma ray created electrons in the direction of the Gamma ray coming at an angle to the long direction of the fibers 49 or at 45° from it 50.

In a plastic scintillator the only significant interaction is through the Compton effect; the maximal 495 energy imparted to an electron is when the Gamma ray is backscattered.

| Gamma Ray ENERGY | 400 keV | | 511 keV | | 1001 KeV | |
|---|---|---|---|---|---|---|
| Compton scattered electron angle | 0° | 45° | 0° | 45° | 0° | 45° |
| Electron energy (keV) | 244 | 125 | 340 | 146 | 797 | 377 |
| Range in plastic scintillator (μ) | 630μ | 209μ | 1023μ | 268μ | 3342μ | 1185μ |
| Energy deposited in a 50μ track | | | 55 keV | | | |
| Energy deposited in a 100μ track | | | 82 keV | | | |

The table shows that if the pixel discriminator is set at 250 keV electron energy level, all Gamma rays below 400 keV, notwithstanding their direction, will be eliminated by the discriminator. Most Gamma rays above 400 keV, notwithstanding their direction will deposit their total energy in several fibers, but at less than 250 keV per fiber and therefore will also be eliminated by the discriminator.

A few Gamma-rays above 400 keV traveling along the fiber's long direction, may hit and scatter electrons forward depositing all their energy in this fiber. The probability of such events is proportional to the solid angle Δω=S/R where (S) is the cross-section of the fiber, and (R) the Range of the forward scattered electron. For 100μ fibers Δω is negligible and <$10^{-3}$.

An energy discriminator embedded in every pixel of the CMOS sensor (54 in FIG. 5*a*) will eliminate the low energy signals due to electrons.

Figure 5A:
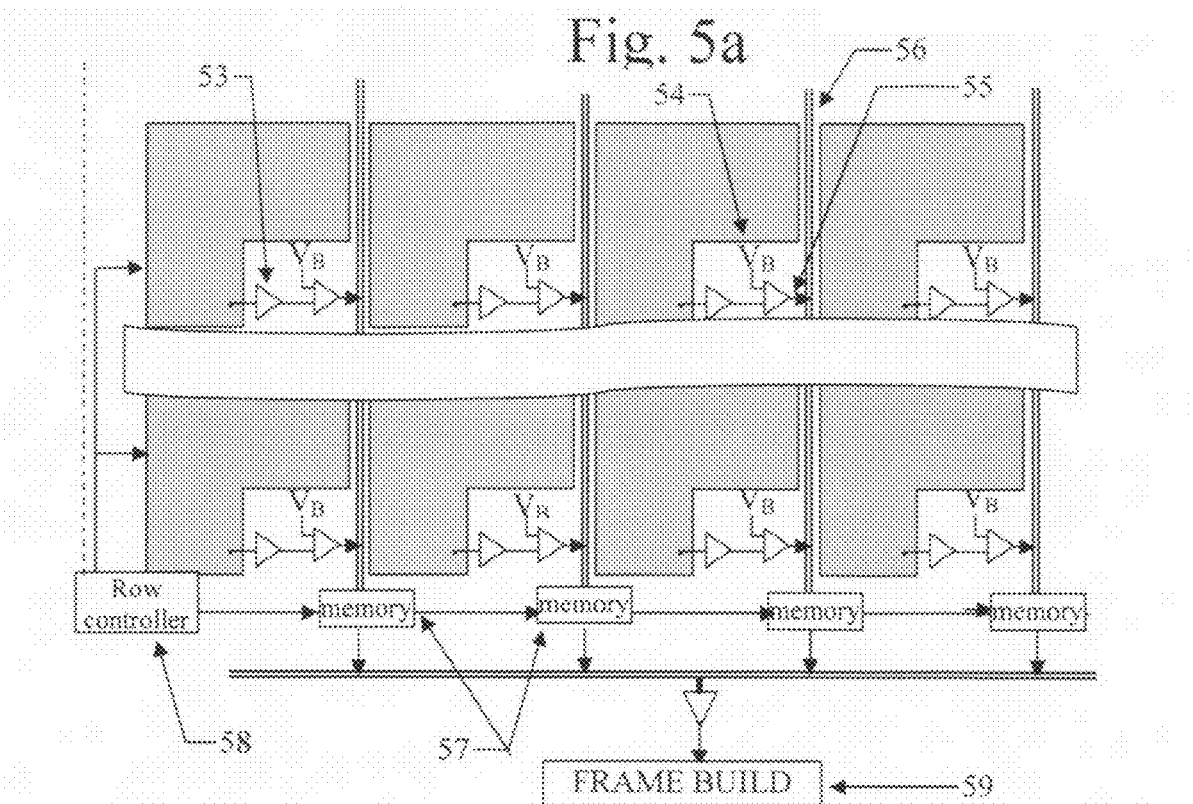
FIGS. 5a and 5b illustrate two signal extraction modes from a CMOS sensor with active pixel readout, for reading the outputs of scintillation fibers

FIG. 5*a* illustrates a CMOS sensor with active pixel readout for reading the output of the scintillation fibers. The CMOS photo-diode output is first amplified 53 and its output fed to a differential amplifier/comparator 55 that acts as a discriminator, rejecting signals that are less than a predetermined level $V_B$ 54. Pulses that are above level $V_B$ are fed into a column waveguide 56 running by the pixels across all the rows of photodetector.

The columns waveguides dump their output to a temporary memory 57 row-after-row under the control of a row controller 58. These temporary memories are then read one after the other and their output fed to frame memory that gives the image of the fibers hit or traversed by a charged particle.

Figure 5B:
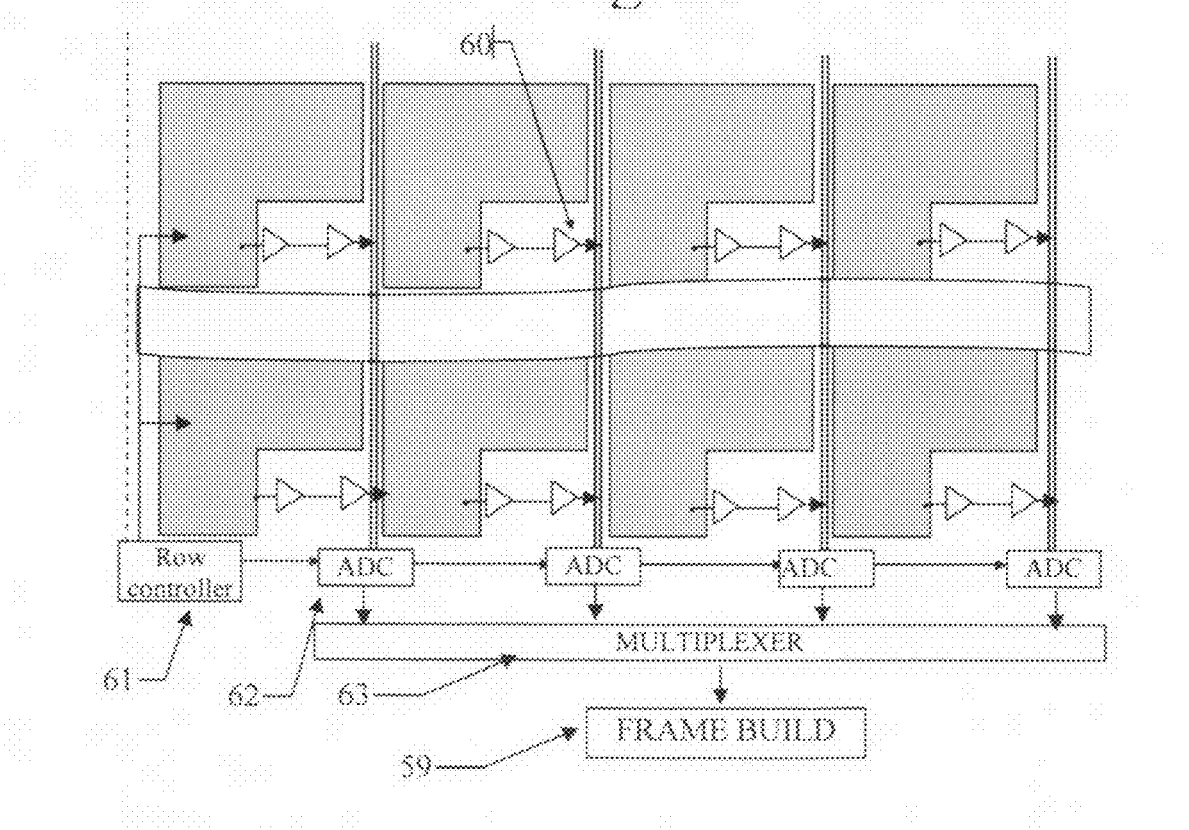

FIG. 5*b* illustrates a slightly different image forming process, where the amplitude of the signal exiting each fiber is amplified 60 and first transmitted as an analog signal under the control of a row controller 61 to a columnar ADC 62. The digitized analog signal is then transmitted to a multiplexer 63 that transmit them in an orderly way to the frame builder 59 that displays the amplitude of the signals exiting the fiber array as an image in gray-scale. The rejection of the gamma ray background is done by subtraction of the low gray levels of the image.

FIG. 6*a* illustrates the distribution of Gamma, Thermal Neutron and Fast Neutron events as a function of the energy deposited per unit of track length. Thermal Neutrons interacting with $Li^6$ generate Tritons and Alphas that deposit all their energy 64 in a short track, only tracks generated close to the edge of a fiber will deposit in a fiber only part of their energy 64*a*. Gamma rays 66 on the other hand have long tracks, deposit in each fiber only a fraction of their energy and therefore only a small part of their energy in a given short track length. Fast Neutrons interacting with a plastic scintillator generate a continuous spectrum of protons 65 that due to their large ∂E/∂x may deposit a large part of their energy in a given track length and consequently have shorter track lengths as compared to gamma rays. As can be qualitatively seen from FIG. 6*a*, the level of the comparator 55 in the active pixels determines the Neutron/Gamma ratio; however decreasing the efficiency of detection of Gamma rays 66*a* comes at a price of rejecting Neutrons of lower energy 65*a*.

FIG. 6*b* illustrates the image of the outputs of the fiber array obtained after a period of one frame (16.6 msec for a 60 frames/sec digital Image sensor). The output of each photosensor pixel is either a (1) or a (0) depending on the level of the discriminator set to eliminate as many gamma rays as possible while optimizing the efficiency of detecting fast and thermal Neutrons.

Thus each frame 68 will look as illustrated in FIG. 6*b*, the image representing the outputs of the fiber array as seen from above. If the discriminator is set to eliminate gamma rays, the number of pixels having an output are the number of fast and thermalized neutrons detected by the array. As the fast and thermalized neutrons hit the fiber array randomly, the hits will be distributed randomly. When a charged particle crosses one or more fibers the image will show that, as a hit to two or more adjacent pixels 67 which will have to be counted as one event. The ratio of single pixel events 69 to that of connected-pixel events is a measure of the directionality of the flux of fast neutrons, as explained above.

In this configuration the counting rate may be as high as $10^6$/sec. In such a case, the counting rate per frame is $1.6 \times 10^4$ counts/frame; as there are $10^6$ pixels in every frame, only one pixel out of 60 has a chance to be hit. In other words the odds of a pixel to be hit in every frame is 1.6%.

Obviously this counting rate is limited by the frame rate of the CMOS sensor. CMOS sensors operating at 10 or even 100 times faster frame rates are available, albeit at higher prices and will allow a proportionally higher counting rate.

The Read noise of the commercial CMOS photo sensors is improving and some are as low as 20 $e^-$ RMS and the Dark current $10^4$ $e^-$/pixel/second. This dark current can be subtracted by Correlated double Sampling and only the RMS of the dark current in a Frame has to be taken in account, which is ≅12 $e^-$.

A particle having an energy of 250 keV deposited in a plastic scintillator, will generate 2,000 photons. In an aerogel clad fiber 30% of these photons will propagate to the end of the fiber; if the combined QE and fill factor is 20%, and the optical coupling only 50% efficient, approximately 60 photoelectrons will be detected by each pixel of the CMOS photodiode, which is higher than the fluctuation of the dark current 12 $e^-$ and the read noise of 25 $e^-$.

Figure 7:
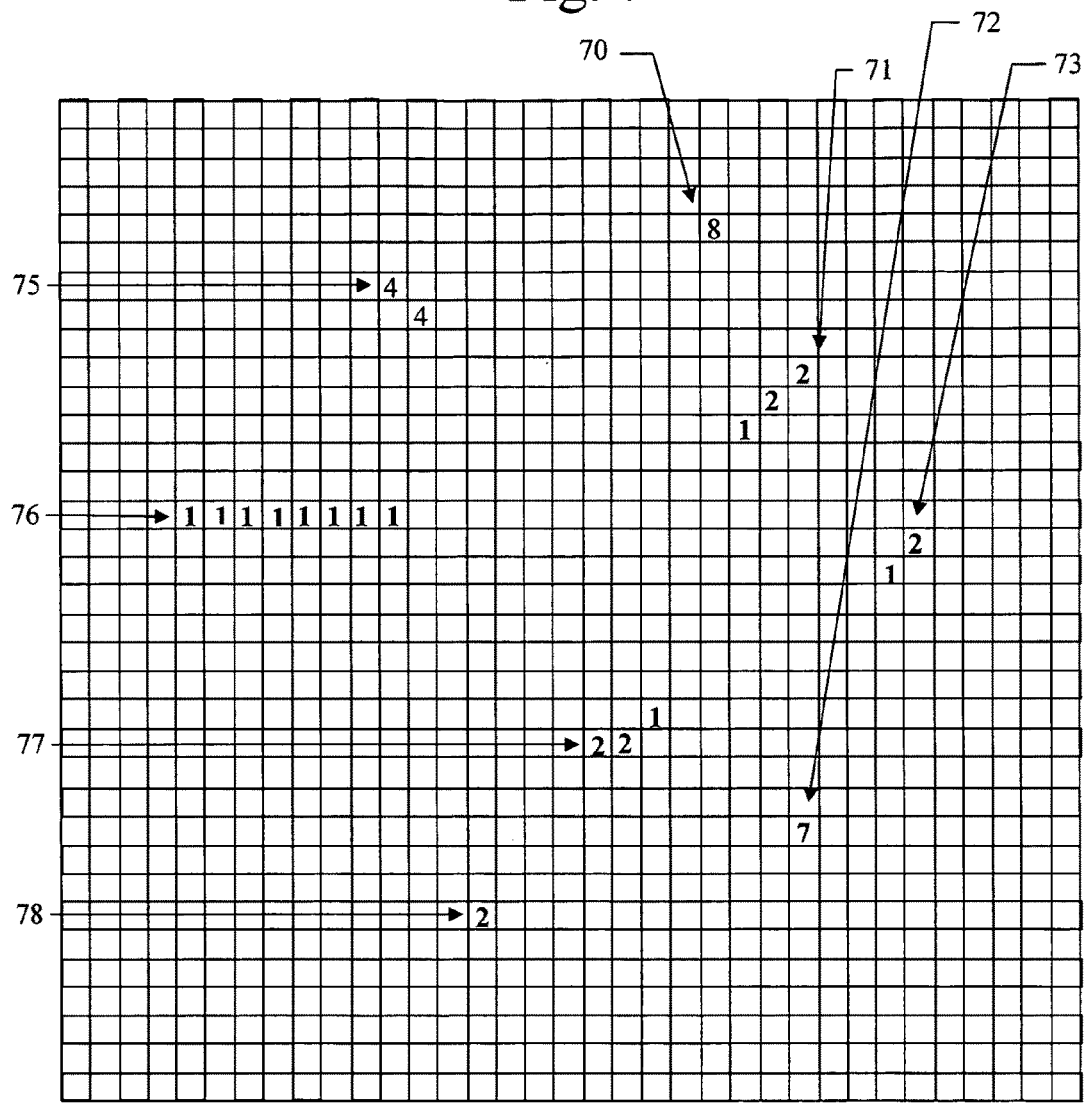
FIG. 7 illustrates the image obtained after one frame by a photodetector array coupled to the fiber array where the signals amplitude is assessed by an analog-to-digital converter

FIG. 7 illustrates the image of the outputs of the fiber array obtained after a period of one frame when the amplitude of the fiber outputs are digitized. Given the low number of photons exiting a fiber a 3 bit digitization is assumed. In this kind of gray-scale display the sequence of fibers crossed by the protons and their respective amplitudes is indicative of the proton tracks direction and range. Thus an amplitude of 8 (3 bits) 70 is indicative of a high energy neutron, kicking a proton in the forward direction and being absorbed in one fiber, which shows that the neutron came in a direction substantially parallel to the fibers long direction. An amplitude of 7 absorbed in a single pixel (fiber) 72 leads to a similar conclusion; a high energy neutron coming along the direction of the fibers. Two adjacent pixels of amplitude 4 each (2 bits) 75 show that a high energy proton came from a 45° direction to the long direction of the fiber. A long track of a high energy proton extending 8 pixels 76 show a high energy proton coming in a direction of the pixels.

As a particle deposits a relatively larger amount of energy at the end of its track, the relative amplitudes along the track are also indicative of the direction of the track. Thus for example a 1, 2, 2 pattern 71 is indicative that the track started at the (1) fiber and proceeded to the (2), (2) pixels, indicating a neutron coming normal to the long direction of fibers. The same conclusion may be drawn from track 73. Track 77 (2, 2, 1) on the other hand shows that the neutron come in a direction close to the long direction of the fibers.

Some of the hits provide little information as to the direction of the source as exemplified by a single low amplitude signal 78; in this case it is impossible to know whether this event was caused by a low energy neutron coming in the direction of the fiber or normal to it, or even high energy neutron coming from any direction and scattering a proton by 60°.

As in practice the fast neutron flux comes from a source, nearby or at a distance, there is a preferred direction. Given the spectrum of the probable sources, and enough statistics, the most probable direction in relation to the fibers long direction relative to the direction normal to the fibers, may be found by iteration, after discarding the events that are not unequivocal.

The process consists of examining the tracks of protons extending over multiple pixels, their respective amplitudes and the direction in 2D of the tracks taking in account that the end of a track will show the highest amplitude. Assuming the direction found by determining the ratio of single-pixel tracks to two-pixel tracks as described above in conjunction with FIG. 6b, the proton direction of multiple-pixel tracks in 2D and their respective pixel amplitudes may be calculated given a Neutron spectrum. The most probable direction may be found by iterating these calculations until the best fit to the actual directions of the proton tracks and their pixel amplitudes is found while varying the assumed original direction of the Neutron beam. If the Neutron spectrum is unknown, several Neutron spectra may be tested until the best fit to the actual data is found.

Figure 8:
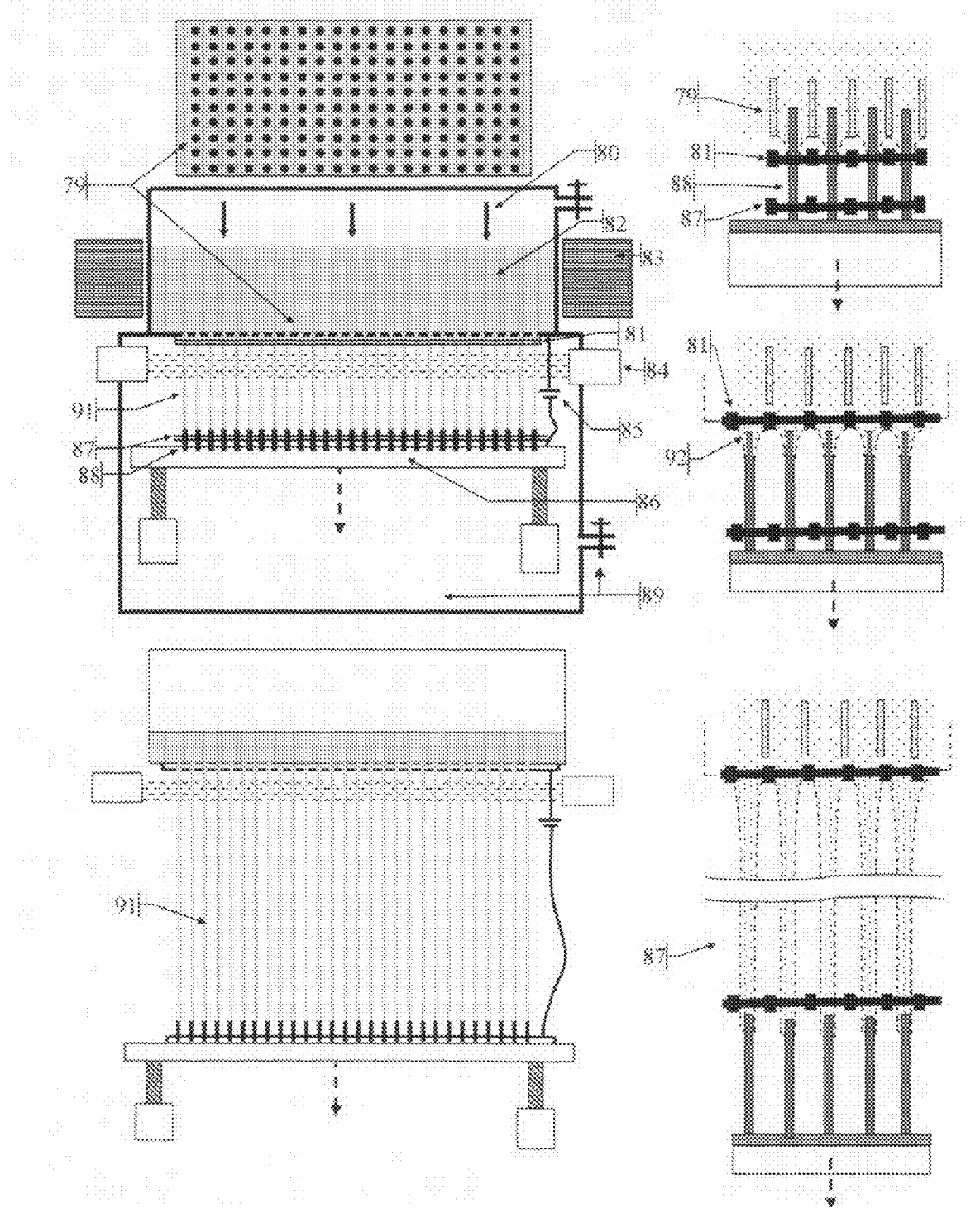
FIG. 8 illustrates a method of manufacturing a 3D array of scintillator fibers by extrusion through a perforated plate.

FIG. 8 illustrates a method of manufacturing arrays of scintillator fibers by extruding them through a perforated plate 79 which may be a linear array or a 2D array of holes. The perforated plate constitutes the bottom of a pressurized vessel 80 which contains a non-polymerized plastic scintillator solution 82. The plate if made of insulating material such as glass, is first coated with a conductive metal coat; the holes and external surface of the perforated plate are preferably coated with an hydrophobic and non-stick material such as Teflon or Wearlon.

The polymerizable mixture may consist of an acrylic monomer mixed with a scintillator such as para-terphenyl or vinyl toluene mixed with PPO or naphtalene and a wavelength shifter such as POPOP (1,4-bis[5-phenyloxazol-2-yl] benzene). Low molecular weight polymer molecules of styrene derivatives e.g. alpha.-methylstyrene, vinyltoluene, dimethylstyrene, dimethyl-.alpha.-methylstyrene and tertiary butylstyrene (Trade names Piccotex, Kristalex and Nevbrite) are easier to melt, an important quality for extruding. A sensitizer is added to the mixture to speed the polymerization of the acrylic monomer when irradiated with heat or microwaves.

Alternatively a commercially available liquefied plastic scintillator such as BC-498 from Saint-Gobain Crystals, may be used.

The space above the polymerizable mixture is filled with an inert gas such as argon and the mixture bubbled several times to get any oxygen out of it. A strong electrical field of several kV 85 is established between the conductive walls of the perforated substrate and the conductive needle-like spikes 88 protruding out of the substrate. At the beginning of the extrusion process, the array of spikes 88, which have a smaller cross-section than the perforated holes 79, are inserted first onto the holes of a thin mesh 81 attached to the bottom of the perforated plate and after that half-way into the holes 79 of the perforated plate. The mixture may be melted by heating it externally with inductive heaters 83. Initially the liquid mixture 82 will not seep through the holes of the perforated substrate due to the surface tension forces until the pressure of the inert gas on the liquid mixture is sufficiently increased to overcome such surface tension forces. When the liquid mixture starts seeping out, the electrostatic field 85 combined with the hydrophilic coating, cause the mixture to link to and spread over 92 the inserted spikes 88 instead of spreading sideways on the surface of the hydrophobic perforated plate. At this stage the substrate covered with the needle-like spikes 88 is started to be retrieved at the same rate that the mixture starts to seep-out. The lowering of the substrate may be controlled by a micro-positioning system 86 using piezo motors or simply by mounting the substrate on a hollow float floating on the surface of a vessel filled with water and emptying the vessel at the desired rate. The oozing mixture can be polymerized by irradiating it with a microwave or IR source 84 thus forming an array of parallel fibers 91. The rate of extrusion of the liquid mixture through the perforated substrate is matched with the rate of polymerization and may be very slow. The entire fiber extrusion system attached to the perforated bottom of the vessel 80 is kept within an evacuated vessel 89 that accelerates the exit of the melted mixture 82 through the perforated holes 79.

Figure 9:
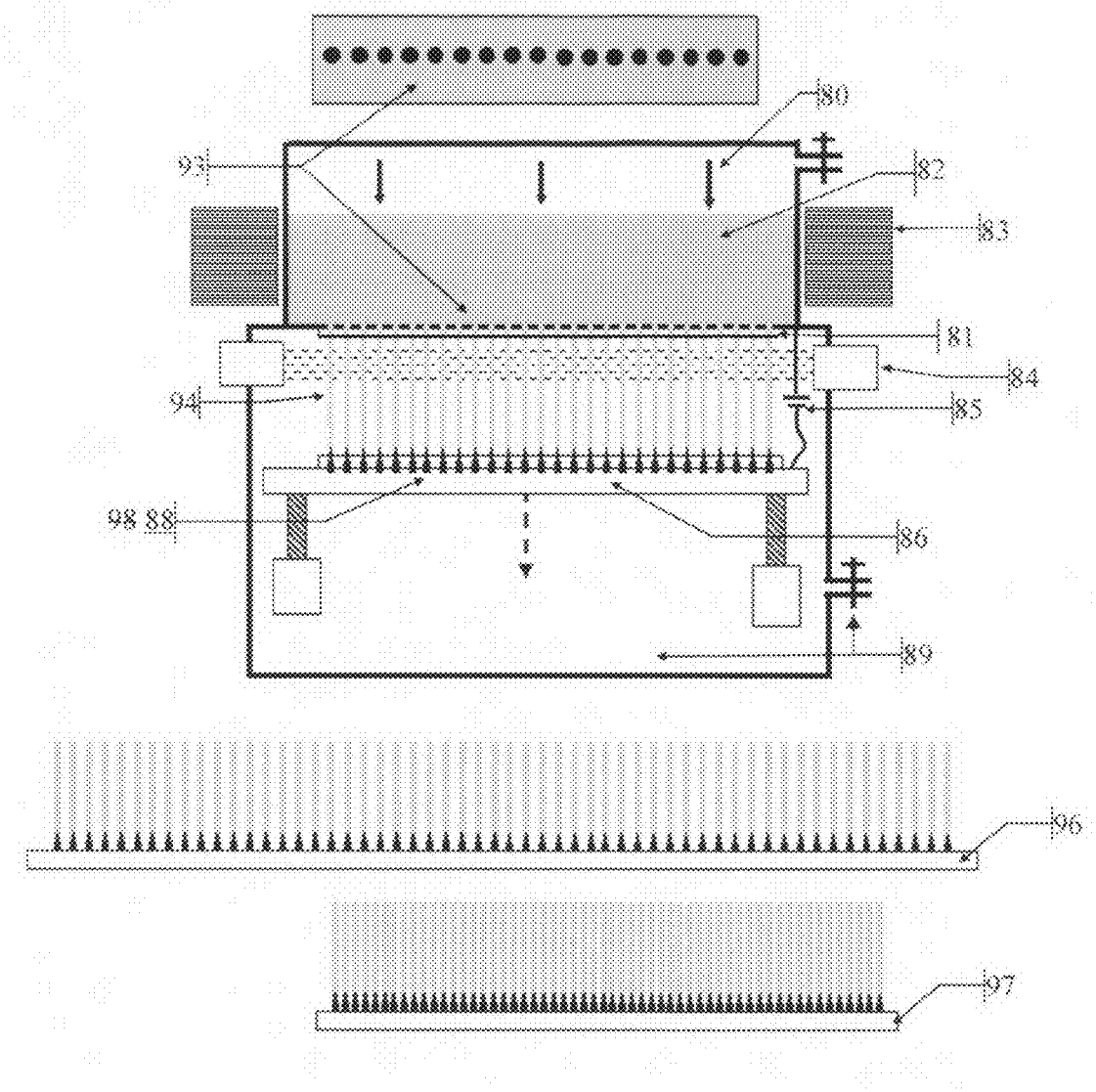
FIG. 9 illustrates a method of manufacturing a 2D array of scintillator fibers by extrusion through a linear array of perforations and depositing them on an elastomeric substrate.

FIG. 9 illustrates the fabrication process of a linear 2D array where the perforated holes 93 are separated by a larger distance than in the process described in conjunction with FIG. 8, in order to prevent the semi liquid mixture of spreading sideways, while it is being extruded through the perforated plate. Such distance may not be the final distance contemplated for the linear fiber array. In this case the pointed spikes may first be deposited on a stretched elastomer 96 at distances each from the other that match the separation of the holes. After the fibers 94 are extruded as described above in conjunction with FIG. 8, the pre-stretched elastomer is let to shrink 97 bringing the bottom of the aligned fibers closer. At this stage the mesh 81 is detached from the bottom of the perforated plate, the extrusion stopped and the linear fiber array separated from the bottom of the extrusion vessel. The distance between the top of the fibers is then matched to that of the bottom by squeezing it mechanically and the very top held together by the mesh, is cut-out and replaced by a continuous melted thin plastic layer which is let to slowly polymerize.

FIG. 10 illustrates a way to hold the straight scintillation fibers array mechanically using two meshes 98 with apertures the size of the cross section of the fibers 99. The fibers may be inserted into the meshes at the beginning of the extrusion of the fiber array as illustrated in FIG. 8. One of the meshes 81 stays connected to the bottom of the extrusion vessel while the second mesh 87 travels with the entire array until the desired length of fibers is extruded. At this stage the meshes are joined with solid bars 100, that reinforce the fiber array structure mechanically. The space between the fibers is then filled with aerogel or foam 102. The difference in the refractive index between plastic fiber and the aerogel or foam determines the critical angle $\theta_c = \arcsin(n_2/n_1)$ 103 where $n_2$ is the refractive index of the aerogel and $n_1$ is the refractive index of the plastic scintillator. Photons hitting the plastic/aerogel interface at an angle less than $\theta_c$ are channeled to the ends of the fiber, while photons hitting the plastic/aerogel interface at an angle larger than $\theta_c$ exit the fiber 104.

Figure 11:
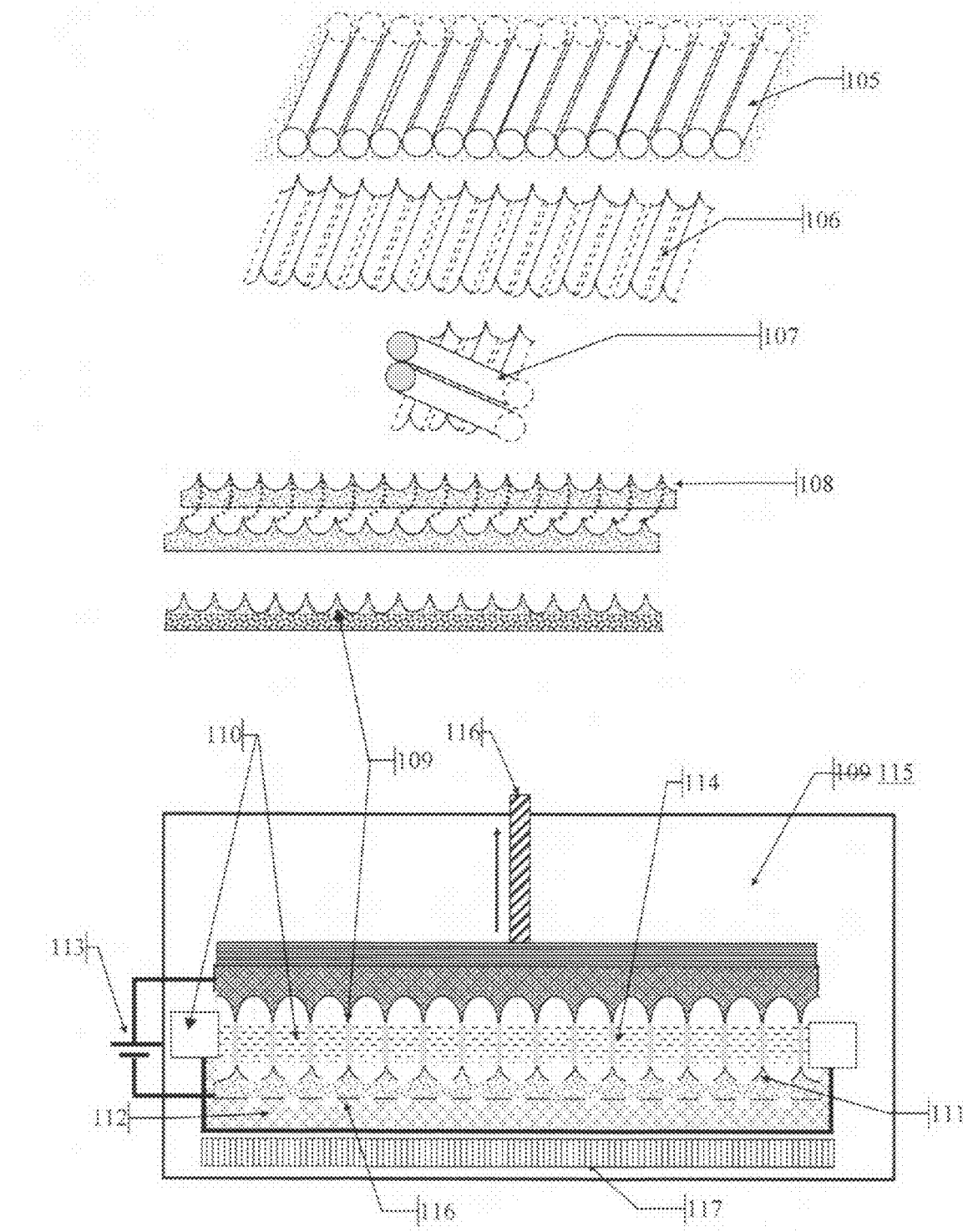
FIG. 11 illustrates a method of manufacturing a scintillator fiber array by pulling it out of a melt of plastic scintillator.

FIG. 11 illustrates a process of forming a two dimensional array of fibers, by pulling the whole structure very slowly out of a heated and liquefied melt, not unlike the process of pulling a crystallized ingot out of a melt of the same material. The process is started by preparing a two dimensional array of sharp, pointed, needle-like elevations above a substrate. Such a substrate may be prepared by pressing wires 105 on a semi-softened polymer, thus embossing a linear array of parallel trenches 106. The array of wires are then detached from the substrate and pressed again 107 on the substrate at 90° angle forming a two dimensional array of pointed elevations 108. The array of spikes may then be electroplated to reinforce the structure and make it conductive.

This substrate 109 is then placed close to the surface of an inductively heated 117 melt of plastic scintillator loaded with the desired elements 112, within an evacuated vessel 115. A planar electrostatic field 113 is maintained between the conductive substrate 109 and a fine mesh 116 within the conductive melt close to its surface. This field is highly intensified near the sharp, pointed elevations of the substrate and will guide the evaporated molecules 111 of the melt towards the array of spikes 109, which will gradually accumulate and start the formation of pillars 114. As the pillars start to form the substrate is slowly retrieved upwards 116, and the pillars irradiated with an IR or microwave heat source 110 in order to cure and polymerize the retrieved material. The electrostatic field remains strongly concentrated on the tips of the pillars and prevents the material from accumulating laterally and growing sideways. The rate of retrieving the substrate from the surface of the heated melt and the distance between the accumulated material and the melt determine the cross sections of the pillars 114 being built.

Figure 12:
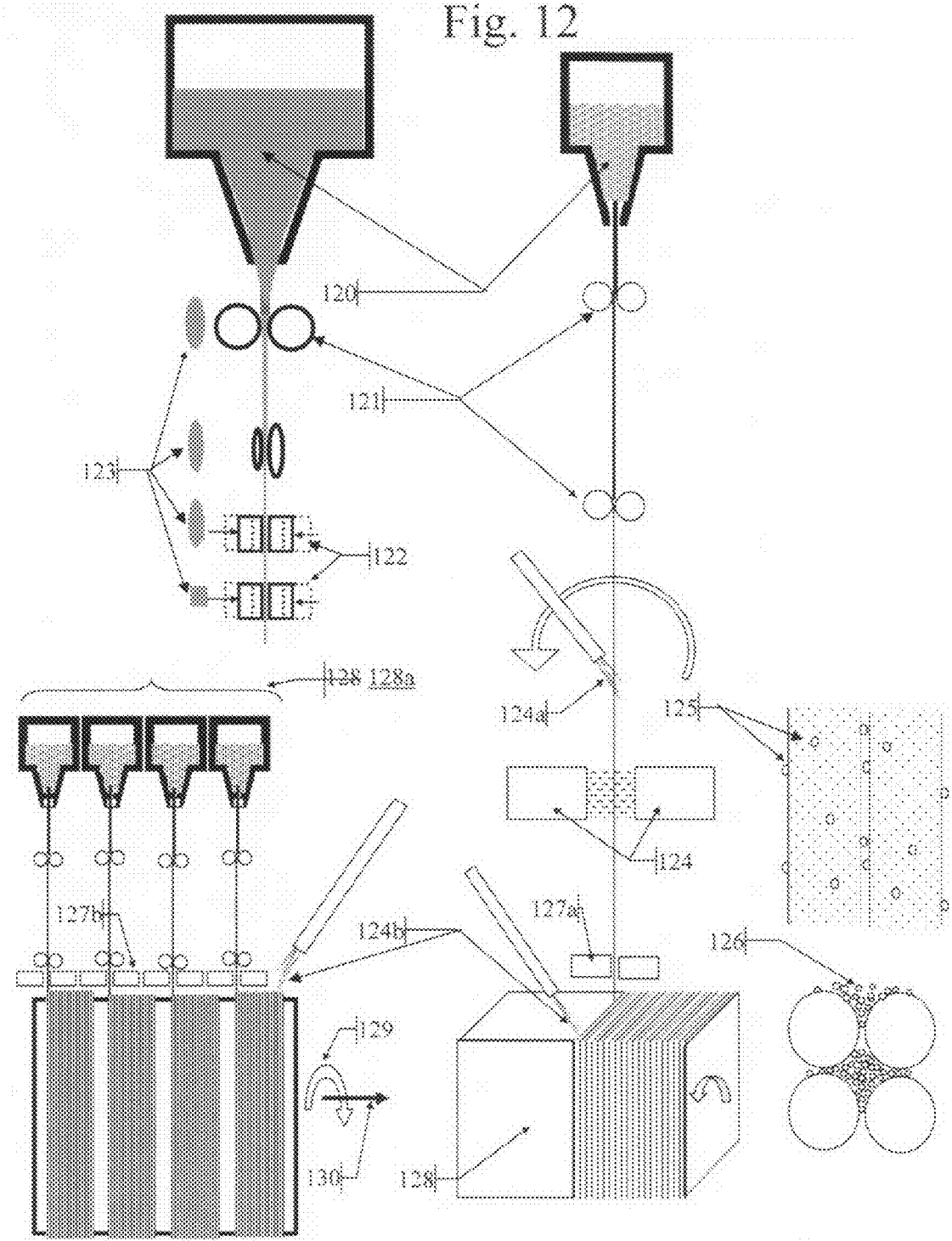
FIG. 12 illustrates a method of manufacturing scintillator fibers array by winding fibers pulled out of nozzles on a rotating spool

FIG. 12 illustrates a method of manufacturing a scintillator fiber array, by winding thinned fibers drawn from a drawing tower, on a square spool. The fibers are pulled out of the heated nozzle of reservoir 120 as known in the art. They are then thinned to the appropriate diameter by pulling and passing them through a series of heated twin rollers 121 under tension, until the desired cross section is reached. The rollers may also exert pressure on the semi-soft material in two mutually orthogonal directions 121, 122 in order to shape the drawn fiber substantially square. A vaporized layer 124a of low refractive index film is injected on the pulled fibers. This film may be a solution of Teflon or Wearlon or a very low density foam such as TPX. The drawn fiber is then cured 123 by a microwave or IR heater. 124

The cured fiber is then wrapped around a forming rectangular spool 128, while revolving and translating it at an appropriate speed, so as to lay the fibers substantially adjacent one to the next. The fibers to be wrapped are led to their precise position on the spool by a guide 127a and 127b controlled by a piezo motor. After each layer a stream of nano or micro particles is mechanically injected/sputtered onto 125 and between the fibers 126 in order to prevent them from touching.

Arrays of fibers are obtained by wrapping around the turning square spool the desired number of layers and then cutting out the 4 sections.

The method of winding a thinned fiber around a spool can be speeded up by putting several nozzles 128a in parallel and winding several fibers around a revolving spool 129 while translating it 130 at the appropriate speed so as to maintain the desired distance between the fibers.

Figure 13:
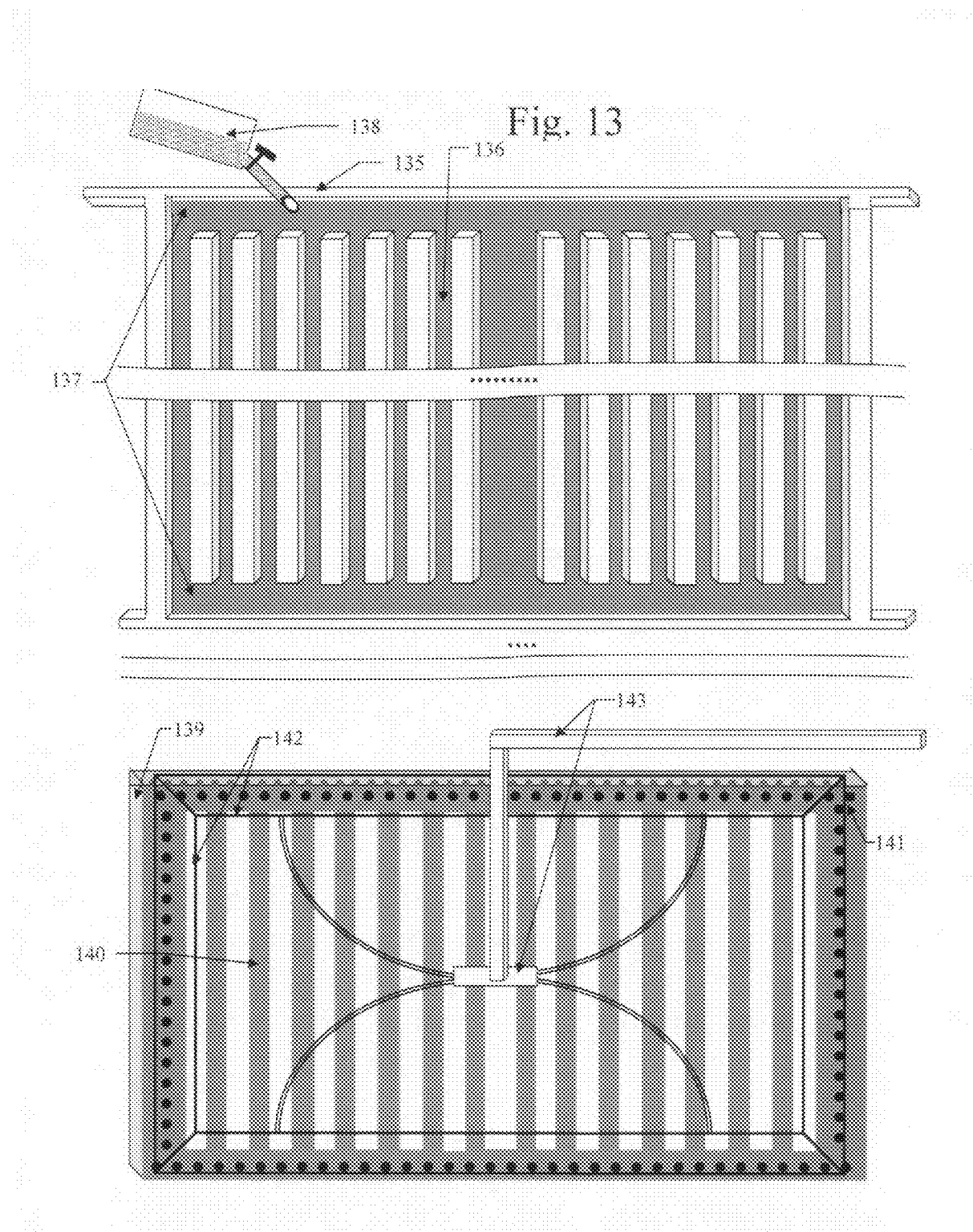
FIG. 13 illustrates a method of manufacturing 2D fiber arrays by depositing a mixture of plastic scintillator in liquid state onto an array of parallel slots carved onto an hydrophobic substrate

FIG. 13 illustrates the fabrication of a planar array of scintillation fibers by filling the previously milled or lithographically etched parallel grooves 136 of a mold 135 with a mixture of non-polymerized plastic scintillator 138 The mixture consists of (a) styrene monomer or vinyl toluene, (b) 1-2% of para-terphenyl or PPO (2,5-Diphenyloxazole) or 1,1 4,4-tetraphenyl butadiene and (c) a Wave Length Shifter (WLS) (1,4-bis[5-phenyloxazol-2-yl]benzene) known as POPOP. The parallel grooves are connected at their top and bottom by two other trenches 137 that run across all the length of the array. The depth of the connecting trenches depends on the mode of stacking the fibers which is further described in connection with FIG. 14.

The grooves are first coated with a non-stick material such as Teflon or Wearlon to facilitate lifting the polymerized array. The mixture is poured gradually onto the trenches connecting the coated grooves and letting the liquid mixture infiltrate the grooves by capillary action.

The plate is then exposed to microwave or IR radiation. The array of fibers 140 is surrounded by a frame 139 of the same thickness that keeps the fiber array structure firm. As the frame starts to polymerize, but still viscous, a thin powder of metallic micro-particles that can be magnetized is injected on the edges of the frame 141. The mixture is then let to fully polymerize and solidify. The polymerization process shrinks the fibers and helps detach them from the grooves.

The frame may be lifted from the plate by a vacuum holder that sucks the frame uniformly from all sides or an electromagnetic fixture 142 that when magnetized attracts the metallic micro-particles and holds the frame 139. The vacuum holder or the electromagnetic fixture may be combined with a robotic arm 143 that lifts the frame from the plate and deposits it on a stack of similar frames. The metallic micro-particles are then magnetized to keep the last transported frame stick firmly onto the previous frame on the stack.

Figure 14:
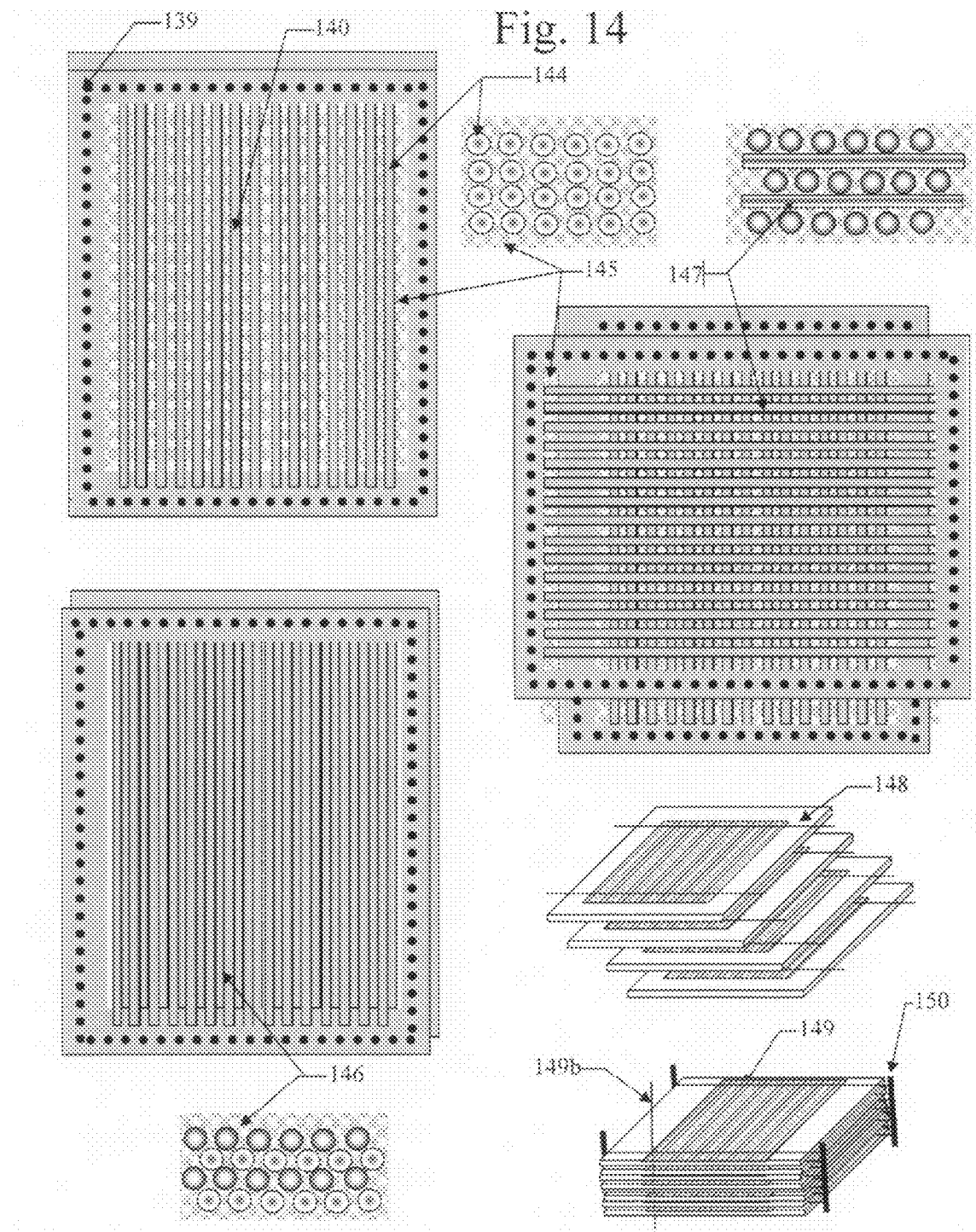
FIG. 14 illustrates the ways the 2D fiber arrays, fabricated by deposition as illustrated in FIG. 13, may be stacked on on top of the other to obtain 3D arrays of different structures

FIG. 14 shows 3 modes of building a stack of such frames. After depositing a frame, a thin layer of aerogel 145 with an effective refractive index of less than 1.10 is spread in the interstices 715 between the fibers and on top of them, to keep them separated. Frames 139 holding fiber arrays 140 can be stacked exactly one on top of another, without staggering 144. This structure is the preferred mode of building a 3D array of fibers, as it is easier to couple it to an array of photo-sensors.

The frames can also be placed one on top of the other in a closed-packed structure every other frame staggered by the pitch between two fibers 146 or one across the previous one 147 in a wood-pile like structure with a separating layer of aerogel 145 in between. The frames 139 that surround the fiber array planes may be cut after building the stacked structure. As each frame is placed on the stack two 10μ thin wires may be placed across the frame 148 near the top and bottom of the fibers. Before the top and bottom of the frames are cut, the wires 149 are joined/glued together 150 so that after the top or bottom of the frame are cut, the fibers are held by the combined structure. It is preferable to cut first one end of the frame and apply the reflecting coat to the fibers; it is also possible to insert between the fibers additional thin wires 149b so that to form a mesh that holds the array of fibers. It is then possible to apply a thin film across the top, for keeping the nanogel particles from dropping from the interstices between the fibers. The bottom of the array may then be cut and the same process applied before coupling them optically to the sensor array.

Figure 15:
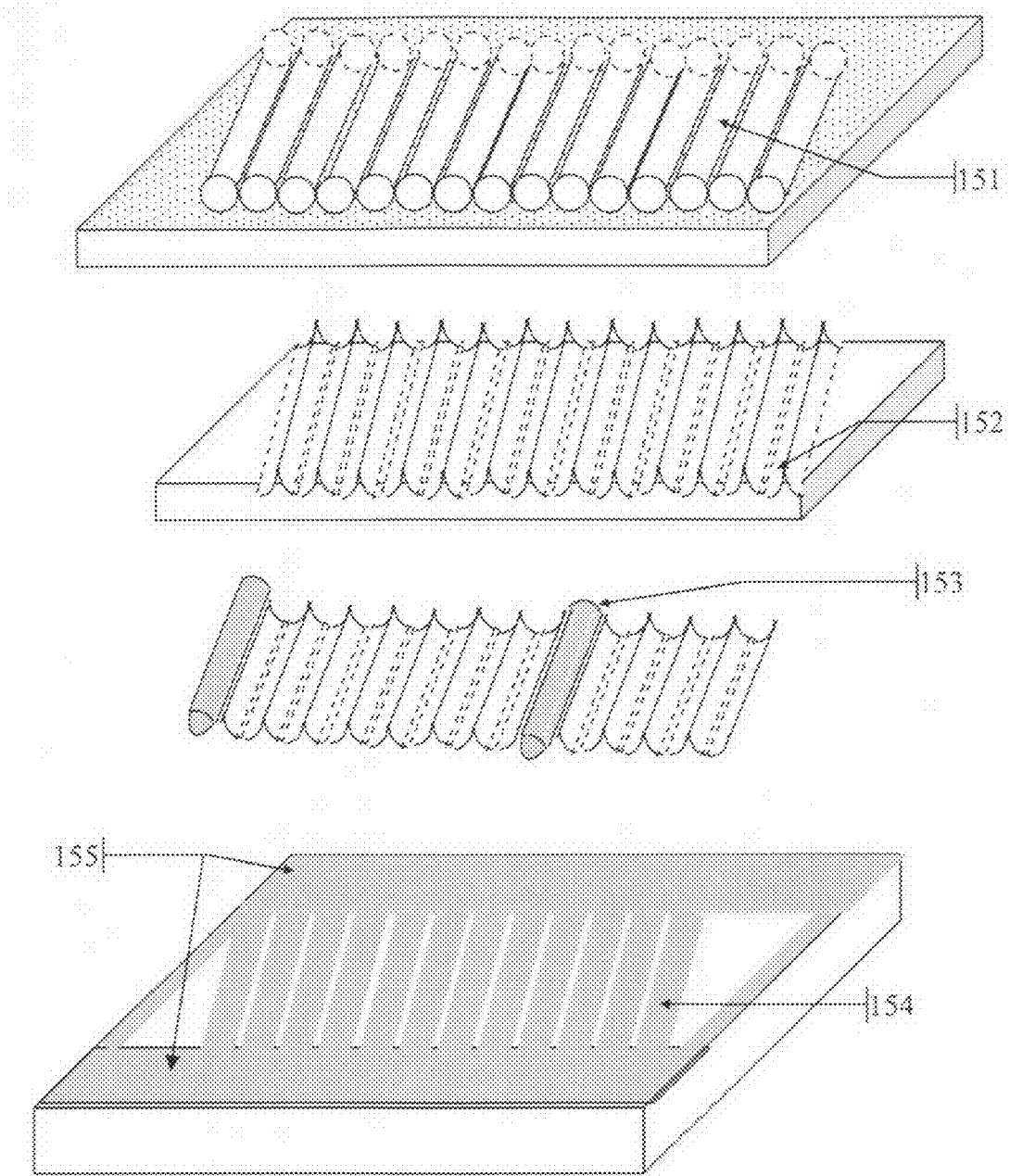
FIG. 15 illustrates a method of fabricating an array of parallel slots by imprinting a high temperature teflon substrate with a parallel array of thin metallic wires and depositing a mixture of plastic scintillator in liquid state onto such slots

FIG. 15 illustrates a different mode of preparation of a mold for casting an array of plastic fibers. First a longitudinal array 151 of thin aluminum or stainless-steel wires cut at the desired length, and placed side-by-side or at a small pitch, is prepared. The array is placed on a high Tg plastic substrate such as Teflon. The array of wires when heated and pressed against the substrate imprint their shape onto the mold 152 and produce a linear array of trenches. A mixture of plastic scintillator when casted into the mold and let polymerize will turn into a plastic scintillator fiber 153. An array of fiber scintillators supported by a frame, may be fabricated in a similar way as described in conjunction with FIG. 13. Milling the teflon plate and carving around the trenches 154 a frame 155 is formed that when filled with a plastic scintillator mixture and let it to polymerize, forms a plastic scintillator fiber array.

FIG. 16 illustrates the structures of two battery operated 167 radiation detectors 159, 160 using very thin scintillation fibers optically coupled 162 to image sensors 163 for detecting gamma and neutron radiations. The scintillations fibers may be loaded with different elements in order to optimize their use and efficiencies for detecting different radiations. In case that only fast neutron detection is required, straight plastic scintillation fibers 160 may be used, without loading any isotopes with high thermal neutron capture cross section.

Thermalizing the fast neutrons and then detecting the thermal neutrons may not always be the best solution for detecting fast neutrons, as the thermalization process destroys the directionality of the detector. For detecting thermal neutrons directly the fibers may be loaded with $Li^6$ as described above. Given the high thermal neutron cross section of $Li^6$, the flux of thermal neutrons are absorbed in the first millimeters of the surface. Therefore a thermal neutron detector insensitive to gamma rays 159 has to be thin with a large surface, as illustrated in FIG. 16.

The plastic scintillation fibers may also be loaded in addition to $Li^6$ with a heavy element such as lead (Pb) in order to enhance the Gamma/X-ray absorption, when the mixed neutron/gamma radiation is to be measured. Adding a layer of lead (Pb) 161 on top of the fibers' long direction will reduce the sensitivity to gamma rays that is highest in this direction. In this case the Pb will also enhance the neutron detection capabilites due to the (n, 2n) reactions.

Measuring the counting rate above an optimal discriminator/comparator level in each active pixel sensor, will give only the fast+thermal neutron levels, while measuring the counting rate above the noise level, will give the sum of the neutron and gamma ray levels.

The plastic scintillation fibers may also be loaded only with a heavy scintillator element such as $CdWO_4$ in order to to enhance the Gamma/X ray absorption in order to detect only fast neutrons and Gamma/X-Rays without being sensitive to thermal neutrons.

Another combination may be loading plastic fibers only with $CdWO_4$ or $PbWO_4$ so as to be sensitive to Gamma rays only; the fiber structure will add directionality to such a detector.

The fiber array with very short plastic scintillation fibers loaded with $CdWO_4$ or $PbWO_4$, may also be utilized as a pocket radiation meter for detecting neutrons and gamma rays above a certain level.

All the detectors may incorporate wireless communication capabilities 166 in order to transmit the radiation levels to a central processor that by combining the readings of multiple detectors may correlate and map radiation fields. The detectors may also incorporate audio devices 168 in order to sound an alarm when needed and counting rate displays 165.

There are multiple ways to realize the invention explained above, combine the differentiating features illustrated in the accompanying figures, and devise new embodiments of the method described, without departing from the scope and spirit of the present invention. Those skilled in the art will recognize that other embodiments and modifications are possible. While the invention has been described with respect to the preferred embodiments thereof, it will be understood by those skilled in the art that changes may be made in the above constructions and in the foregoing sequences of operation without departing substantially from the scope and spirit of the invention. All such changes, combinations, modifications and variations are intended to be included herein within the scope of the present invention, as defined by the claims. It is accordingly intended that all matter contained in the above description or shown in the accompanying figures be interpreted as illustrative rather than in a limiting sense.

I claim:

1. A directional Neutron detector comprising
   a. an array of plastic scintillation fibers, where
      each of said fibers have a diameter of approximately 100 micrometers and
      a.1. are bundled along their long dimension and
      a.2. are mutually non-touching and
      a.3. are separated by materials of average refractive index of less than 1.1 comprising Aerogel
   b. a CMOS Camera with Active Pixels and
   c. optical elements for coupling the light outputs of each said fibers to each of the Active Pixels of the Camera and
   d. electronic comparators embedded in each of the Active Pixels of the Camera and
   e. an Image processor for extracting the identity and average direction of the Neutrons from the statistical distribution of signals and their respective amplitudes in adjacent pixels of the Camera.

2. A directional Neutron detector as in claim 1 where
   the fibers have one of their ends coated with material reflective to photons emitted by the plastic scintillator and
   the non-coated ends of the fibers are coupled to the pixels of the Camera that have substantially the same lateral dimensions as those of the fibers by
   two half-sphere lenses joined back-to-back, having a diameter equal to the pitch of the fibers in the fiber array and positioned in close proximity to the fibers' ends.

3. A directional Neutron detector as in claim 1 where
   the fibers have one of their ends coated with material reflective to photons emitted by the plastic scintillator and
   the active areas of the pixels of the Camera are smaller than the lateral dimensions of the fibers and
   each of said fibers are first coupled to two half-sphere lenses joined back-to-back to form a spherical lens having a diameter equal to the pitch of the fibers in the fiber array and positioned in close proximity to the fibers' end and the parallelized light rays exiting each of the spherical lenses are coupled to the pixels of the Camera, on a one-to-one basis, by a demagnifying combination of refractive and diffractive optical elements.

4. A directional Neutron detector as in claim 1 where the fibers are close-packed, in the sense that alternate odd and even rows of fibers are staggered by a distance equal to half the pitch of the fibers in a row and the non-coated ends of fibers in alternate rows, are optically coupled to the active pixels of one of the two Cameras situated at the two diametrically opposite sides of the fiber array, on a one-to-one basis, where the optical coupling consists of two half-sphere lenses joined back-to-back, having a diameter equal to the pitch of the fibers and positioned in close proximity to the fibers' ends and where the pixels of the camera have substantially the same lateral dimensions as those of the fibers and the ends of fibers not coupled to the pixels of the Camera facing them are coated with material reflective to photons emitted by the plastic scintillator.

5. A directional Neutron detector as in claim 1 where the fibers are close-packed, in the sense that alternate odd and even rows of fibers are staggered by a distance equal to half the pitch of the fibers in a row and the non-coated ends of fibers in alternate rows, are optically coupled to the active pixels of one of the two Cameras situated at the two diametrically opposite sides of the fiber array, on a one-to-one basis where the optical coupling consists of two half-sphere lenses joined back-to-back, having a diameter equal to the pitch of the fibers and positioned in close proximity to the fibers' ends followed by a demagnifying set of refractive and diffractive lenses and where the pixels of the camera have substantially smaller lateral dimensions as those of the fibers and the ends of fibers not coupled to the pixels of the Camera facing them are coated with material reflective to photons emitted by the plastic scintillator.

6. A directional Neutron detector as in claim 1 where the level of Neutron radiation is determined by counting the number of tracks $T_n$ imaged by the camera, when the comparator levels in each of the active pixels of the Camera are set above the level of the maximal energy that may be deposited by traversing electrons.

7. A Neutron detector as in claim 6 for determining the Gamma ray radiation in the presence of Neutron radiation by subtracting the number of tracks proportional to the Neutron radiation, from the total number of tracks determined by the Image processor when the electronic comparators embedded in every pixel of the CMOS sensor are set at a level immediately above the noise level.

8. A directional Neutron detector as in claim 1 where the Image processor determines the most probable direction of a Neutron beam by an iterative process consisting in a. assuming that the ratio of the number of tracks ending within a single fiber, to that crossing several adjacent fibers is m to the angular direction of the neutron beam, relative to the fibers long direction b. calculating the direction of multiple-pixel tracks in 2D and their respective pixel amplitudes given said assumed neutron beam direction and a neutron spectrum and c. Finding the differences in direction and amplitudes between the calculated and actual multiple pixel tracks and d. Minimizing said differences by gradually changing the assumed direction of the neutron beam in said iterative process.

9. A neutron detector as in claim 1 for determining the flux of both fast and thermal neutrons where the fibers are loaded with one of a group of elements having a high neutron capture cross section consisting of Boron, Cadmium, Gadolinium and Lithium.

10. A Neutron detector as in claim 1, substantially insensitive to fast neutrons, for determining the flux of thermal neutrons where one of the lateral dimensions of the 3D fiber array is less than 100 fibers thick and where the other two dimensions are substantially larger and where the direction of the source of thermal neutrons is determined by finding the direction at which the counting rate is maximized.

11. A Neutron detector as in claim 1 where the bundle of non-touching fibers are held together by a mechanical structure comprising two meshes inserted onto the top and bottom of the fiber array where the period of the meshes are the same as the period of the bundle of fibers and where solid bars attached between the top and bottom of said meshes in order to reinforce the structure mechanically.

12. A Neutron detector as in claim 1 for enhancing the sensitivity to Neutrons while reducing the sensitivity to Gamma rays comprising a layer of lead surrounding said detector.

* * * * *